United States Patent
Wang et al.

(10) Patent No.: US 12,429,605 B2
(45) Date of Patent: Sep. 30, 2025

(54) KINEMATIC POSITIONING WITH INERTIAL CONSTRAINTS

(71) Applicant: QUALCOMM Incorporated, San Diego, CA (US)

(72) Inventors: Min Wang, Tustin, CA (US); Gengsheng Zhang, Cupertino, CA (US); Ning Luo, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 520 days.

(21) Appl. No.: 17/716,862

(22) Filed: Apr. 8, 2022

(65) Prior Publication Data
US 2023/0324566 A1 Oct. 12, 2023

(51) Int. Cl.
*G01S 19/43* (2010.01)
*G01S 19/39* (2010.01)
*G01S 19/49* (2010.01)

(52) U.S. Cl.
CPC ............ *G01S 19/43* (2013.01); *G01S 19/393* (2019.08); *G01S 19/49* (2013.01)

(58) Field of Classification Search
CPC ......... G01S 19/393; G01S 19/43; G01S 19/49
See application file for complete search history.

(56) References Cited

U.S. PATENT DOCUMENTS

| | | | | |
|---|---|---|---|---|
| 2002/0198656 A1* | 12/2002 | Ford | ........................ | G01S 19/46 |
| | | | | 701/472 |
| 2009/0278738 A1* | 11/2009 | Gopinath | ................. | G01S 19/47 |
| | | | | 455/574 |
| 2014/0022121 A1* | 1/2014 | Donovan | ................. | G01S 19/49 |
| | | | | 342/357.49 |

FOREIGN PATENT DOCUMENTS

| | | | | |
|---|---|---|---|---|
| CN | 105759292 A * | 7/2016 | ............. | G01S 19/42 |
| CN | 113296133 A * | 8/2021 | ............. | G01S 19/49 |
| CN | 114166207 A * | 3/2022 | | |
| WO | 0120260 A1 | 3/2001 | | |
| WO | 02099453 A2 | 12/2002 | | |
| WO | WO-2019033464 A1 * | 2/2019 | ........... | G01C 21/165 |
| WO | 2022006031 A1 | 1/2022 | | |

OTHER PUBLICATIONS

Earth centered earth fixed (ecef). (2001). In Hargrave's Communications Dictionary, Wiley (1st ed.), https://search.credoreference.com/articles/Qm9va0FydGljbGU6MTQ2NDY3Mg== (Year: 2001).*

(Continued)

*Primary Examiner* — Vladimir Magloire
*Assistant Examiner* — Fred H Mull
(74) *Attorney, Agent, or Firm* — Polsinelli

(57) ABSTRACT

Systems and techniques are provided for determining positioning. For example, the systems and techniques can include obtaining an inertial height measurement, wherein the inertial height measurement is obtained based on a determination that one or more positioning signals are unavailable. A height constraint can be generated using the inertial height measurement, wherein the height constraint is generated based at least in part on a transition matrix. One or more positioning measurements can be determined based on using the height constraint as a real-time kinematic (RTK) positioning input.

27 Claims, 9 Drawing Sheets

(56) References Cited

OTHER PUBLICATIONS

University Physics vol. 1, 2.2 Coordinate Systems and Components of aVector, 24 pages, https://courses.lumenlearning.com/suny-osuniversityphysics/chapter/2-2-coordinate-systems-and-components-of-a-vector, Retrieved Aug. 24, 2024 (Year: 2024).*

M.N.O. Sadiku, Elements of Electromagnetics, 3rd Edition, Oxford University Press, p. 28-52 (Year: 2000).*

International Search Report and Written Opinion—PCT/US2023/063981—ISA/EPO—Jun. 13, 2023.

* cited by examiner

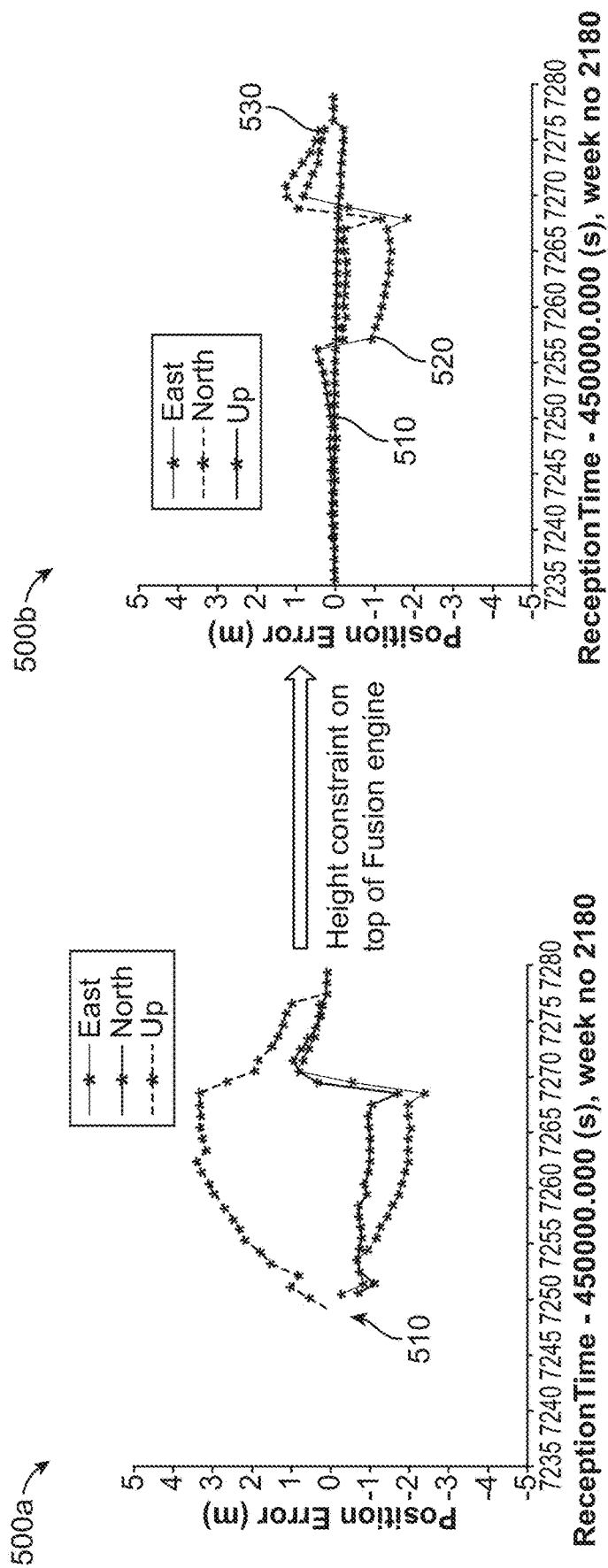

KINEMATIC POSITIONING WITH INERTIAL CONSTRAINTS

FIELD

The present disclosure generally relates to positioning of devices. For example, aspects of the present disclosure are related to real-time kinematic (RTK) positioning and inertial measurement.

BACKGROUND

Electronic devices can include systems that determine a location of the electronic device based at least in part on signals received from a Global Navigation Satellite System (GNSS). Examples of GNSS systems include the Global Positioning System (GPS); the Global Orbiting Navigation Satellite System (GLONASS); the BeiDou Navigation Satellite System (BDS); and Galileo. GNSS receivers can be integrated into mobile electronic devices, such as smartphones or smartwatches, as well as into navigation systems in different types of vehicles, including cars, trucks, ships, and aircraft. GNSS signals are received by GNSS receivers from multiple satellites orbiting the Earth and processed to determine the GNSS receiver's location and, by proxy, the location of the device, vehicle, etc. GNSS signals can additionally be processed to determine other information such as speed, heading, altitude, etc.

GNSS augmentation systems can be used to improve the performance of GNSS-based positioning and location estimation. For example, Assisted GNSS (A-GNSS) is a GNSS augmentation system wherein a network provides assistance data to an electronic device to assist in acquiring and measuring GNSS signals and/or in computing a location estimate from the GNSS measurements. Real-time kinematic (RTK) positioning is a satellite navigation technique that is used to enhance the precision of position data determined from GNSS measurements. For example, a reference station can observe the carrier wave of a satellite signal and transmit correction information to a moving GNSS receiver, based on the reference station observation. When the satellite signal is a GPS signal, RTK positioning can also be referred to as carrier-phase enhancement (CPGPS).

SUMMARY

In some examples, systems and techniques are described for improved kinematic positioning using one or more inertial constraints. For example, the systems and techniques can utilize inertial measurement unit (IMU) data to generate one or more position update inputs to a kinematic positioning engine during a positioning signal outage. According to at least one illustrative example, a method for determining positioning is provided. The method includes: obtaining an inertial height measurement, wherein the inertial height measurement is obtained based on a determination that one or more positioning signals are unavailable; generating a height constraint using the inertial height measurement, wherein the height constraint is generated based at least in part on a transition matrix; and determining one or more positioning measurements based on using the height constraint as a real-time kinematic (RTK) positioning input.

In another example, an apparatus for determining positioning is provided that includes at least one memory (e.g., configured to store data, such as virtual content data, one or more images, etc.) and at least one processor (e.g., implemented in circuitry) coupled to the at least one memory. The at least one processor is configured to and can: obtain an inertial height measurement, wherein the inertial height measurement is obtained based on a determination that one or more positioning signals are unavailable; generate a height constraint using the inertial height measurement, wherein the height constraint is generated based at least in part on a transition matrix; and determine one or more positioning measurements based on using the height constraint as a real-time kinematic (RTK) positioning input.

In another example, a non-transitory computer-readable medium is provided that has stored thereon instructions that, when executed by one or more processors, cause the one or more processors to: obtain an inertial height measurement, wherein the inertial height measurement is obtained based on a determination that one or more positioning signals are unavailable; generate a height constraint using the inertial height measurement, wherein the height constraint is generated based at least in part on a transition matrix; and determine one or more positioning measurements based on using the height constraint as a real-time kinematic (RTK) positioning input.

In another example, an apparatus for determining positioning is provided. The apparatus includes: means for obtaining an inertial height measurement, wherein the inertial height measurement is obtained based on a determination that one or more positioning signals are unavailable; means for generating a height constraint using the inertial height measurement, wherein the height constraint is generated based at least in part on a transition matrix; and means for determining one or more positioning measurements based on using the height constraint as a real-time kinematic (RTK) positioning input.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures:

FIG. 5A is a graph illustrating an example real-time kinematic (RTK) position error before and after a positioning signal outage, in accordance with some examples;

FIG. 5B is a graph illustrating an example RTK position error before and after a positioning signal outage, when one or more IMU position constraints are applied to an RTK engine;

DETAILED DESCRIPTION

Figure 1:
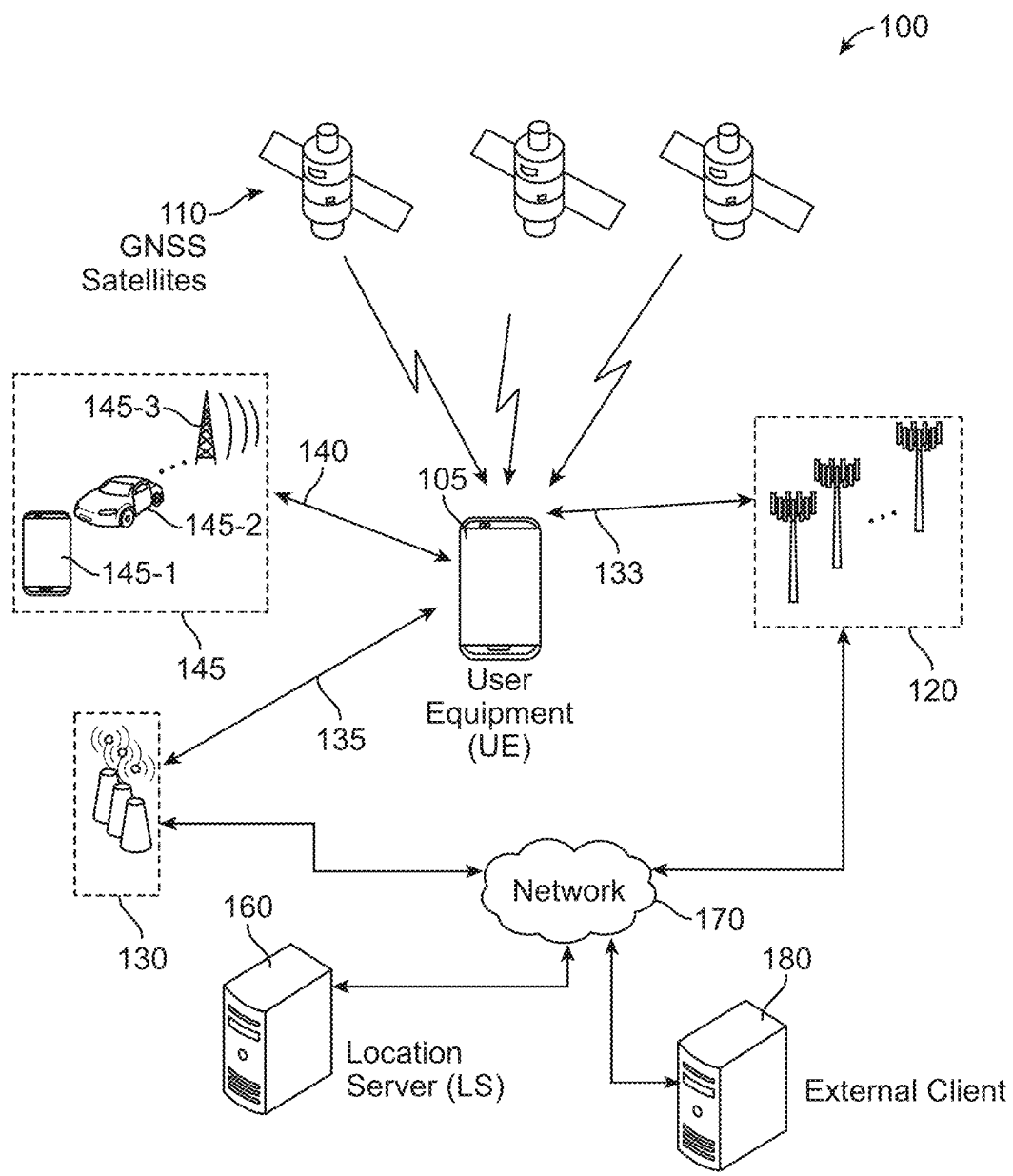
FIG. 1 is a graph illustrating an example global navigation satellite system (GNSS) positioning system, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Systems, apparatuses, processes (also referred to as methods), and computer-readable media (collectively referred to as "systems and techniques") are described herein for improved kinematic positioning using one or more inertial constraints. For example, the systems and techniques can utilize inertial measurement unit (IMU) data to generate one or more position update inputs to a kinematic positioning engine during a positioning signal outage. In some examples, the IMU data can include position data and/or position information generated using IMU-based dead reckoning or other inertial navigation techniques. In some cases, the kinematic positioning engine can be a real-time kinematic (RTK) positioning engine. The RTK positioning engine can be included in a precision positioning engine (PPE) and/or a Global Navigation Satellite System (GNSS)-based PPE.

In some examples, the systems and techniques can use IMU data to generate one or more position update inputs in response to a positioning signal outage, such as a GNSS signal outage. In some cases, the positioning signal outage can be determined based on detecting a loss of one or more RTK base correction measurements. In some examples, the positioning signal outage can be determined based on detecting a loss of one or more RTK carrier-phase measurements.

In some cases, the systems and techniques can apply a full three-dimensional (3D) IMU position constraint based on a determination that an IMU dead reckoning (DR) age is below a first threshold. For example, a full 3D IMU position constraint can be applied when the IMU DR age is below 10 seconds. In some examples, the systems and techniques can apply the full 3D IMU position constraint based on a determination that an IMU uncertainty (e.g., an uncertainty of an IMU DR-based position determination) is below a second threshold. For example, the full 3D IMU position constraint can be applied when the IMU uncertainty is below 0.1 meters. In some examples, the systems and techniques can apply the full 3D IMU position constraint based on a determination that the IMU DR age is below the first threshold and the IMU uncertainty is below the second threshold.

In some examples, the systems and techniques can use a partial IMU position constraint when the IMU DR age is above the first threshold and/or when the IMU uncertainty is above the second threshold. The partial IMU position constraint can be an IMU height constraint (e.g., a measured height value or displacement along a height dimension of the coordinate system associated with the IMU). A transition matrix can be used to transform the IMU height value (also referred to as an "inertial height value" or "inertial height measurement") into a representation in a Cartesian coordinate system associated with the RTK engine. The Cartesian representation (e.g., projection) of the inertial height measurement obtained from the IMU can be provided as a measurement update input to a Kalman filter of the RTK engine and used to determine one or more positioning measurements for a current time step or epoch of the RTK engine during a GNSS signal outage, as will be described in greater depth below. For example, the measurement update to the Kalman filter can be used to determine or update one or more of a position measurement (e.g., as mentioned above), a clock measurement or term, an inter-satellite-type bias (ISTB) measurement or term, an ambiguities measurement or term, etc.

Further details regarding the systems and techniques described herein will be discussed below with respect to the figures.

FIG. 1 is a simplified illustration of a positioning system 100. The positioning system 100 can include a UE 105, one or more GNSS satellites 110 (or SVs) for a GNSS such as GPS, base stations 120, access points (APs) 130, location server (LS) 160, network 170, and an external client 180. Generally put, the positioning system 100 can estimate a location of the UE 105 based on radio frequency (RF) signals received by and/or sent from the UE 105 and known locations of other components (e.g., GNSS satellites 110, base stations 120, APs 130) transmitting and/or receiving the RF signals.

In this example, FIG. 1 illustrates the UE 105 as a smartphone device, however, UEs may be any suitable device that includes GNSS capabilities or may be a device or machine into which such GNSS capabilities are integrated. Thus, a UE 105 may include personal devices such as a smartphone, smartwatch, tablet, laptop, etc. However, UEs may include a larger class of device as well and may include vehicles with integrated GNSS receivers and positioning systems, such as boats or ships, cars, trucks, aircraft, shipping containers, etc.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to LS 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a WLAN, a WWAN, and/or the Internet, for example. Particular examples of network 170 include a Long Term Evolution (LTE) wireless network, a Fifth Generation (5G) wireless network (also referred to as New Radio (NR) wireless network), a Wi-Fi wireless local area network (WLAN) and the Internet. LTE, 5G and NR are wireless technologies defined, or being defined, by the 3rd Generation Partnership Project (3GPP). Network 170 may also include more than one network and/or more than one type of network.

The base stations (BS) 120 and access points (APs) 130 are communicatively coupled to the network 170. In some embodiments, the base station 120 may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. An AP 130 may comprise a Wi-Fi AP or a Bluetooth AP, for example. Thus, UE 105 can send and receive information with network-connected devices, such as LS 160, by accessing the network 170 via a base station 120 using a first communication link 133. Additionally or alternatively, because APs 130 also may be communicatively coupled with the network 170, UE 105 may communicate with Internet-connected devices, including LS 160, using a second communication link 135.

The LS 160 may comprise a server and/or other computing device configured to determine an estimated location of UE 105 and/or provide data (e.g., "assistance data") to UE 105 to facilitate the location determination. According to some embodiments, LS 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in LS 160. In some embodiments, the LS 160 may comprise, a Discovered SLP (D-SLP) or an Emergency SLP (E-SLP). The LS 160 may also comprise an Enhanced Serving Mobile Location Center (E-SMLC) that supports location of UE 105 using a control plane (CP) location solution for LTE radio access by UE 105. The LS 160 may further comprise a Location Management Function (LMF) that supports location of UE 105 using a control plane (CP) location solution for 5G or NR radio access by UE 105. In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between LS 160 and UE 105 as data (e.g., data transported using the Internet Protocol (IP) and/or Transmission Control Protocol (TCP)) from the perspective of network 170.

As previously noted, the estimated location of UE 105 may be based on measurements of RF signals sent from and/or received by the UE 105. In particular, these measurements can provide information regarding the relative distance and/or angle of the UE 105 from one or more components in the positioning system 100 (e.g., GNSS satellites 110, APs 130, base stations 120). The estimated location of the UE 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of the UE 105 may be estimated at least in part based on measurements of RF signals 140 communicated between the UE 105 and one or more other UEs 145, which may be mobile or fixed. As illustrated, other UEs may include, for example, a mobile phone 145-1, vehicle 145-2, and/or static communication/positioning device 145-3. When or more other UEs 145 are used in the position determination of a particular UE 105, the UE 105 for which the position is to be determined may be referred to as the "target UE," and each of the one or more other UEs 145 used may be referred to as an "anchor UE." For position determination of a target UE, the respective positions of the one or more anchor UEs may be known and/or jointly determined with the target UE. Direct communication between the one or more other UEs 145 and UE 105 may comprise sidelink and/or similar Device-to-Device (D2D) communication technologies. Sidelink, which is defined by 3GPP, is a form of D2D communication under the cellular-based LTE and NR standards.

According to some embodiments, such as when the UE 105 comprises and/or is incorporated into a vehicle, a form of D2D communication used by the UE 105 may comprise vehicle-to-everything (V2X) communication. V2X is a communication standard for vehicles and related entities to exchange information regarding a traffic environment. V2X can include vehicle-to-vehicle (V2V) communication between V2X-capable vehicles, vehicle-to-infrastructure (V2I) communication between the vehicle and infrastructure-based devices (commonly termed roadside units (RSUs)), vehicle-to-person (V2P) communication between vehicles and nearby people (pedestrians, cyclists, and other road users), and the like. Further, V2X can use any of a variety of wireless RF communication technologies. Cellular V2X (CV2X), for example, is a form of V2X that uses cellular-based communication such as LTE (4G), NR (5G) and/or other cellular technologies in a direct-communication mode as defined by 3GPP. The UE 105 illustrated in FIG. 1 may correspond with a component or device on a vehicle, RSU, or other V2X entity that is used to communicate V2X messages. The static communication/positioning device 145-3 (which may correspond with an RSU) and/or the vehicle 145-2, therefore, may communicate with the UE 105 and may be used to determine the position of the UE 105 using techniques similar to those used by base stations 120 and/or APs 130 (e.g., using multiangulation and/or multilateration). It can be further noted that UEs 145 (which may include V2X devices), base stations 120, and/or APs 130 may be used together (e.g., in a WWAN positioning solution) to determine the position of the UE 105, according to some embodiments.

An estimated location of UE 105 can be used in a variety of applications—e.g., to assist direction finding or navigation for a user of UE 105 or to assist another user (e.g., associated with external client 180) to locate UE 105. A "location" is also referred to herein as a "location estimate", "estimated location", "location", "position", "position estimate", "position fix", "estimated position", "location fix" or "fix". A location of UE 105 may comprise an absolute location of UE 105 (e.g., a latitude and longitude and possibly altitude) or a relative location of UE 105 (e.g., a location expressed as distances north or south, east or west and possibly above or below some other known fixed location or some other location such as a location for UE 105 at some known previous time). A location may also be specified as a geodetic location (as a latitude and longitude) or as a civic location (e.g., in terms of a street address or using other location related names and labels). A location may further include an uncertainty or error indication, such as a horizontal and possibly vertical distance by which the location is expected to be in error or an indication of an area or volume (e.g., a circle or ellipse) within which UE 105 is expected to be located with some level of confidence (e.g., 95% confidence).

The external client 180 may be a web server or remote application that may have some association with UE 105 (e.g., may be accessed by a user of UE 105) or may be a server, application, or computer system providing a location service to some other user or users which may include obtaining and providing the location of UE 105 (e.g., to enable a service such as friend or relative finder, asset tracking or child or pet location). Additionally or alternatively, the external client 180 may obtain and provide the location of UE 105 to an emergency services provider, government agency, etc.

Figure 2:
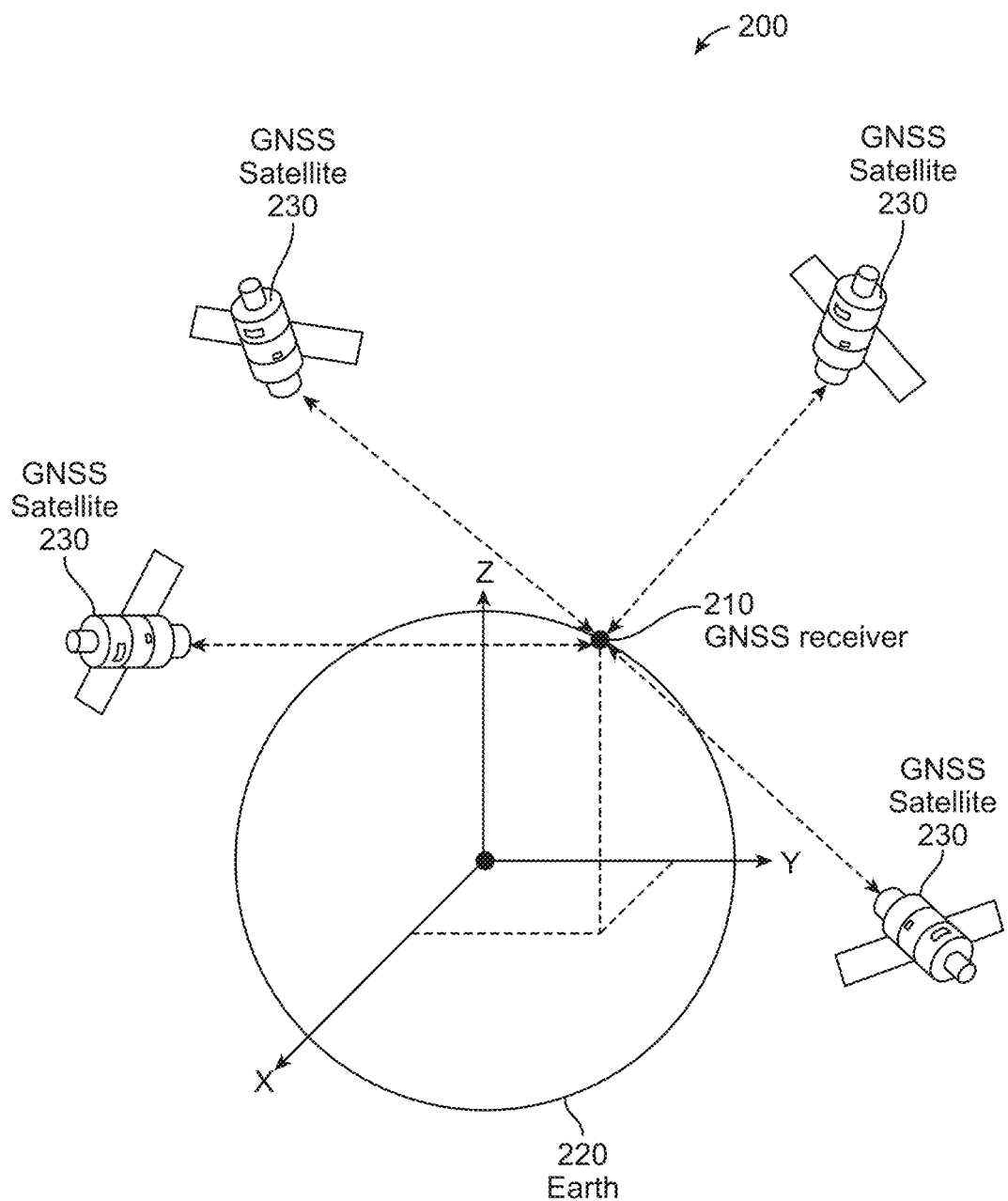
FIG. 2 is a diagram of an simplified example GNSS system, in accordance with some examples.

As illustrated in FIG. 1, the position of UE 105 may be determined in a variety of ways. Moreover, a positioning engine (e.g., Kalman filter) executed by the user equipment 105 may use position estimates from one or more of a variety of sources (GNSS, RAT-based positioning, etc.) to determine a final estimated location for the UE 105. FIG. 2 and the corresponding description below provide some additional detail regarding how the position of a GNSS receiver of the UE 105 may be determined.

FIG. 2 is a simplified diagram of a GNSS system 200, provided to illustrate how GNSS is generally used to determine an accurate location of a GNSS receiver 210 on earth 220. As previously noted, a GNSS receiver 210 may be incorporated into a UE 105 or similar mobile device, and GNSS positioning may be one of a plurality of positioning techniques that may be employed to determine the location of the UE/mobile device. Put generally, the GNSS system 200 enables an accurate GNSS position fix of the GNSS receiver 210, which receives radio RF signals from GNSS satellites 230 from one or more GNSS constellations. (GNSS satellites 230 of FIG. 2 may correspond with GNSS satellites 110 of FIG. 1.)

It will be understood that the diagram provided in FIG. 2 is greatly simplified. In practice, there may be dozens of satellites 230 and a given GNSS constellation, and there are many different types of GNSS systems. GNSS systems include, for example, GPS, Galileo, GLONASS, and BDS, as noted. Additionally, GNSS systems may include Quasi-Zenith Satellite System (QZSS) over Japan, Indian Regional Navigational Satellite System (IRNSS) over India, and/or the like. In addition to the basic positioning functionality later described, GNSS augmentation (e.g., a Satellite Based Augmentation System (SBAS)) may be used to provide higher accuracy. Such augmentation may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

GNSS positioning is based on trilateration, which is a method of determining position by measuring distances to points at known coordinates. In general, the determination of the position of a GNSS receiver 210 in three dimensions may rely on a determination of the distance between the GNSS receiver 210 and four or more satellites 230. As illustrated, 3D coordinates may be based on a coordinate system (e.g., cartesian coordinates represented by X,Y,Z values; geographic coordinates represented by latitude, longitude, and altitude values; etc.) centered at the earth's center of mass. A distance between each satellite 230 and the GNSS receiver 210 may be determined using precise measurements made by the GNSS receiver 210 of a difference in time from when a radio frequency RF signal is transmitted from the respective satellite 230 and when it is received at the GNSS receiver 210. To help ensure accuracy, not only does the GNSS receiver 210 need to make an accurate determination of when the respective signal from each satellite 230 is received, but many additional factors need to be considered and accounted for. These factors include, for example, clock differences at the GNSS receiver 210 and satellite 230 (e.g., clock bias), a precise location of each satellite 230 at the time of transmission (e.g., as determined by the broadcast ephemeris), the impact of atmospheric distortion (e.g., ionospheric and tropospheric delays), and the like.

To perform a traditional GNSS position fix, the GNSS receiver 210 can use code-based positioning to determine its distance to each satellite 230 based on a determined delay in a generated pseudorandom binary sequence received in the RF signals received from each satellite, in consideration of the additional factors and error sources previously noted. With the distance and location information of the satellites 230, the GNSS receiver 210 can then determine a position fix for its location. This position fix may be determined, for example, by a Standalone Positioning Engine (SPE) executed by one or more processors of the GNSS receiver 210. However, code-based positioning is relatively inaccurate and, without error correction, is subject to many of the previously described errors. Even so, code-based GNSS positioning can provide a positioning accuracy for the GNSS receiver 210 on the order of meters.

More accurate carrier-based ranging can be performed based on a carrier wave of the RF signals from satellites and may use measurements at a base or reference station (not shown) to perform error correction to help reduce errors from the previously noted error sources. More specifically, errors (e.g., atmospheric errors sources) in the carrier-based ranging of satellites 230 observed by the GNSS receiver 210 can be mitigated or canceled based on similar carrier-based ranging of the satellites 230 using a highly accurate GNSS receiver at the base station at a known location. These measurements and the base station's location can be provided to the GNSS receiver 210 for error correction. This position fix may be determined, for example, by a Precise Positioning Engine (PPE) executed by one or more processors of the GNSS receiver 210. More specifically, in addition to the information provided to an SPE, the PPE may use base station GNSS measurement information, and additional correction information, such as precise orbit and/or clock information, troposphere and ionosphere (e.g., information of the atmospheric layers through which the GNSS signal physically propagates from satellite to receiver), to provide a high accuracy, carrier-based position fix. Several GNSS techniques can be adopted in PPE, such as Differential GNSS (DGNSS), Real-time kinematic (RTK) positioning, and Precise Point Positioning (PPP), and may provide a sub-meter accuracy (e.g., on the order of centimeters).

In some examples, an SPE may utilize only broadcast ephemeris information (e.g., navigation data) associated with the GNSS satellites, and the typical positioning accuracy of the SPE can be approximately on the meter level. By utilizing additional information beyond that utilized by an SPE, a PPE can achieve a positioning accuracy on order of centimeters, as described above. For example, DGNSS positioning can use a pseudo-range correction from one or more base stations to obtain an improved accuracy position fix.

DGNSS positioning and RTK positioning are both GNSS-based PPE techniques. Like DGNSS positioning, RTK positioning can utilize one or more pseudo-range corrections from the base stations. RTK positioning can additionally utilize one or more carrier-phase corrections to achieve an improved positioning accuracy compared to standard GNSS positioning, SPE-based positioning, and/or DGNSS positioning. Because the measurement quality (e.g., noise and multipath level) of carrier-phase measurement is much better than that of pseudo-range measurement, RTK positioning can achieve a positioning accuracy between the centimeter and decimeter level.

RTK positioning can be performed between a rover device side and a base station side. The rover device can be a moving electronic device (e.g., smartphone) or other device associated with a GNSS receiver (e.g., a vehicle). The base station (e.g., an RTK base station) can remain static or non-moving relative to the rover device. The rover device and the RTK base station can both receive or otherwise measure GNSS signals transmitted by the same GNSS satellite(s). The RTK base station uses its measurement of the GNSS signals to calculate and transmit one or more RTK base corrections to each rover device.

At the rover device side, for both the pseudo-range and carrier-phase measurements, the rover device can apply the RTK base corrections to reduce or cancel out most GNSS error sources. The GNSS error sources that can be reduced or canceled out at the rover device by using the RTK base corrections can include, but are not limited to, satellite orbit and clock error, satellite Differential Code Bias (DCB), satellite Phase Center Offset (PCO) and Phase Center Variation (PCV), ionospheric and tropospheric delays, phase wind-up, site displacement (e.g., including solid earth tide, ocean loading, pole tide), etc.

After applying the RTK base correction(s), the pseudo-range and carrier-phase measurements can be respectively expressed, for a given satellite vehicle (SV) of a GNSS, as:

$$\Delta P_{b,r}^{j} = \Delta \rho_{b,r}^{j} + \Delta dT_{b,r}^{j} + \Delta \epsilon(P_{b,r}^{j}) \qquad \text{Eq. (1)}$$

$$\Delta \Phi_{b,r}^{j} = \Delta \rho_{b,r}^{j} + \Delta dT_{b,r}^{j} + \lambda \cdot \Delta N_{b,r}^{j} + \Delta \epsilon(\Phi_{b,r}^{j}) \qquad \text{Eq. (2)}$$

Here, the subscripts b, r, and j refer respectively to a base station (e.g., RTK base station), a rover device, and a given SV. The left-hand term in Eq. (1), $\Delta P_{b,r}^{j}$, represents the pseudo-range difference between the base station and rover device Single Differenced (SD) carrier phase for the SV (e.g., GNSS satellite) j. The left-hand term in Eq. (2), $\Delta \Phi_{b,r}^{j}$, represents the carrier phase difference between the base station and rover device Single Differenced (SD) carrier phase for the SV j. $\Delta \rho_{b,r}^{j}$ represents the SD geometry and $\Delta dT_{b,r}^{j}$ represents the SD receiver clock. $\lambda$ is the carrier phase wavelength; $\Delta N_{b,r}^{j}$ is the SD integer ambiguity; and $\Delta \epsilon$ is the SD noise and multipath.

In some examples of RTK positioning, to achieve centimeter level of positioning accuracy, the integer ambiguity term in the carrier phase measurement should be resolved correctly. For example, ambiguity resolution techniques can include LAMBDA (Least-squares Ambiguity Decorrelation Adjustment). By adopting the ambiguity resolution, the integer ambiguity can be resolved correctly within a relatively short period of time (e.g., several minutes or seconds), rather than waiting multiple minutes (e.g., tens of minutes) for float ambiguity convergence.

In some examples, the RTK performance of an RTK positioning system can be heavily degraded when GNSS signals experience outage. In some cases, GNSS outages can occur due to one or more environmental conditions that block, prevent, and/or reduce the ability of a GNSS receiver to measure a GNSS signal. For example, a GNSS outage can occur when a GNSS receiver (e.g., provided on a smartphone or vehicle) passes through a tunnel or underneath an overpass, which are overhead obstructions that can cause temporary blockage of the GNSS signal(s). A GNSS signal outage can occur in both open sky environments and in urban environments and can be of varying duration (e.g., the amount of time between the GNSS signal outage first occurring and the GNSS signal subsequently being recovered at a GNSS receiver).

A GNSS signal outage can include a complete signal loss and/or a partial signal loss. For example, a complete GNSS signal outage may occur when a GNSS receiver is unable to measure or receive a GNSS signal. A partial GNSS signal outage may occur when a GNSS receiver is able to measure or receive only a portion of the GNSS signal(s) needed to perform positioning. For example, a GNSS receiver might measure only a single GNSS signal when multiple GNSS signal measurements are needed to perform positioning for the receiver.

A signal outage can occur due to radio frequency (RF) interference and/or various environmental factors. In some examples, a rover device may experience a simultaneous outage in its own GNSS signal measurements (e.g., obtained locally) and in the RTK base corrections (e.g., obtained from a base station). For example, if the rover device passes underneath an overpass or into a tunnel, a simultaneous outage may occur in both the GNSS signal measurements and in the RTK base corrections. In some cases, a rover device may experience an outage in the GNSS signal measurements while still receiving at least a portion of the RTK base correction signal(s). In some examples, a rover device may obtain an RTK pseudo-range measurement while being unable to obtain (e.g., a complete outage) an RTK carrier phase measurement.

As mentioned above, a GNSS signal outage can include multiple types of GNSS signals. For example, RTK positioning can be performed based on a GNSS signal measurement at the rover (e.g., moving) device and an RTK base correction performed and transmitted by a base station. In the example of an RTK positioning system, a GNSS signal outage can include a complete or partial loss of the GNSS signals measured by the rover device and/or can include a complete or partial loss of the RTK base correction signal transmitted to the rover device by the base station. For example, when GNSS signals experience outage due to blockage, frequent cycle slips can occur on RTK carrier phase measurements (e.g., a partial loss in the RTK carrier phase measurement), and in some cases, the RTK carrier phase measurements may be entirely unavailable (e.g., a complete loss in the RTK carrier phase measurement). In both cases, GNSS signal outages can cause heavy degradation in the accuracy and/or performance of RTK positioning systems and/or other GNSS-based PPE systems.

As mentioned previously, GNSS-based precise positioning engine (e.g., PPE) systems and techniques can be used to achieve a sub-meter or better (e.g., centimeter or decimeter level) accuracy in determined position performance. GNSS-based PPE systems and techniques can achieve greater accuracy over a GNSS-only system based at least in part on receiving one or more additional inputs that can be used to correct errors in measured GNSS signals and/or can be used to correct errors in a determined position based on the measured GNSS signals. For example, as mentioned previously, RTK positioning can be performed based at least in part on receiving one or more additional inputs that include RTK base corrections.

In some cases, RTK positioning systems and/or other GNSS-based PPE systems can experience heavy degradation in accuracy and performance based on experiencing even a short (e.g., temporary) GNSS signal outage, such as when passing underneath a highway overpass. In some examples, an RTK positioning system may lose track of an RTK carrier phase measurement during a short or temporary GNSS signal outage, which can cause the positioning accuracy and performance to degrade. For example, the positioning accuracy and performance of an RTK positioning system experiencing GNSS signal outage can degrade to a level that is the same as or below that of a GNSS-only system without signal outage.

In one illustrative example, the accuracy and performance of an RTK positioning system can be improved by using one or more inertial measurement units (IMUs). For example, IMU sensor and/or position data can be used by an RTK positioning system during periods of GNSS signal outage. The IMU data can include position data, velocity data, etc., and can be used or applied to an RTK positioning system as a constraint, as will be described in greater depth below. In some examples, the IMU data can be used to perform dead reckoning to determine position and/or velocity data for the RTK positioning system. In some cases, the IMU data itself can include dead reckoning information and/or position and velocity information derived by performing dead reckoning.

In some examples, one or more IMUs can be used with an RTK positioning system, GNSS-based PPE positioning system, or other positioning system experiencing a positioning signal outage. The one or more IMUs can be included in, attached to, or otherwise associated with an electronic device (e.g., smartphone) or other device implementing GNSS-based PPE. In some examples, one or more IMUs can be included in, attached to, or otherwise associated with a PPE and/or a GNSS receiver. An IMU can include one or more accelerometers and one or more gyroscopes for obtaining inertial measurements. In some cases, an IMU can include one or more magnetometers.

The one or more accelerometers of an IMU can provide acceleration information or measurements across an IMU local frame. The IMU local frame can also be referred to as a body frame (e.g., forward/backward, left/right, up/down directions), in examples where the IMU is aligned to a vehicle body. The one or more gyroscopes of an IMU can measure angular velocity around the IMU local frame. The one or more magnetometers of an IMU can measure the Earth's magnetic field and can be used to derive a heading (e.g., associated with the motion, path, and/or orientation of the IMU). In some examples, an IMU including one or more magnetometers can be described as a 9-axis IMU. An IMU without a magnetometer (e.g., including one or more accelerometers and one or more gyroscopes) can be described as a 6-axis IMU.

An IMU can be used to perform inertial navigation using techniques such as dead reckoning to iteratively update an initial location using one or more displacement vectors calculated based on the IMU data. The position output error of an IMU-based position determination accumulates when integrating over longer periods of time, as will be discussed below with respect to FIGS. 3A-3D and FIG. 4. In some examples, IMU-based position determination may not typically be affected by environmental factors, whether indoor or outdoor, in open-sky or urban environments, etc. In some examples, IMU data can be used to increase the output rate (e.g., of determined position) associated with a PPE positioning system. In some cases, a GNSS receiver may have a maximum output rate of approximately 10 Hertz (Hz), which can limit the maximum output rate of an associated RTK or PPE to approximately the same rate. An IMU can have a maximum output rate for determined position or dead reckoning information of 100-200 Hz, which in some cases be used to increase the maximum output (e.g., solution) rate of an associated RTK or PPE that utilizes IMU data. In some examples, PPE solution availability of a GNSS-based PPE technique (e.g., RTK positioning) can be improved by integrating the PPE with IMU data during a GNSS or positioning signal outage due to environmental change, as will be described in greater depth below.

In one illustrative example, the systems and techniques described herein can use IMU data to perform RTK or other positioning determination(s) during periods of positioning signal outage. For example, IMU data can be used to perform dead reckoning based on an initial position measurement, including a three-dimensional (3D) inertial position measurement, wherein the IMU data is used to update the initial position in a series of temporal steps or displacements determined from the inertial information contained in the IMU data. In some examples, the initial position provided to the IMU or otherwise used to perform dead reckoning can be a position of the GNSS receiver, RTK positioning system, and/or PPE. The position can be the last known position prior to experiencing an GNSS or positioning signal outage. In some examples, the GNSS receiver, RTK positioning system and PPE can be included in or associated with the same electronic device (e.g., smartphone) or object (e.g., vehicle), and the initial position provided to the IMU or otherwise used to perform dead reckoning can be a position of the electronic device or the object.

In some cases, the IMU data can be used to determine a three-dimensional (3D) position (e.g., by using the IMU data to perform dead reckoning from the initial position) with relatively high accuracy over short periods of time, such as when an RTK positioning system and/or PPE is unable to determine an accurate position or is unable to determine a sufficiently accurate position. In some examples, the IMU data can be used to determine a three-dimensional (3D) inertial position measurement. For example, the systems and techniques described herein can use IMU data to determine accurate 3D position information during GNSS or other positioning signal outages. In some examples, IMU data and associated derived 3D position information may be accurate for relatively short periods of time, where the time period is measured as the elapsed time since an initial position was provided to the IMU or dead reckoning calculation based on IMU data. For example, after receiving an externally derived initial position (e.g., the last known position determined by the RTK positioning system), IMU data can be used to determine accurate 3D position information over periods of several seconds. In some examples, the elapsed time from providing an initial position to an IMU for dead reckoning can be referred to as a dead reckoning age or a DR age.

Figures 3A, 3B:
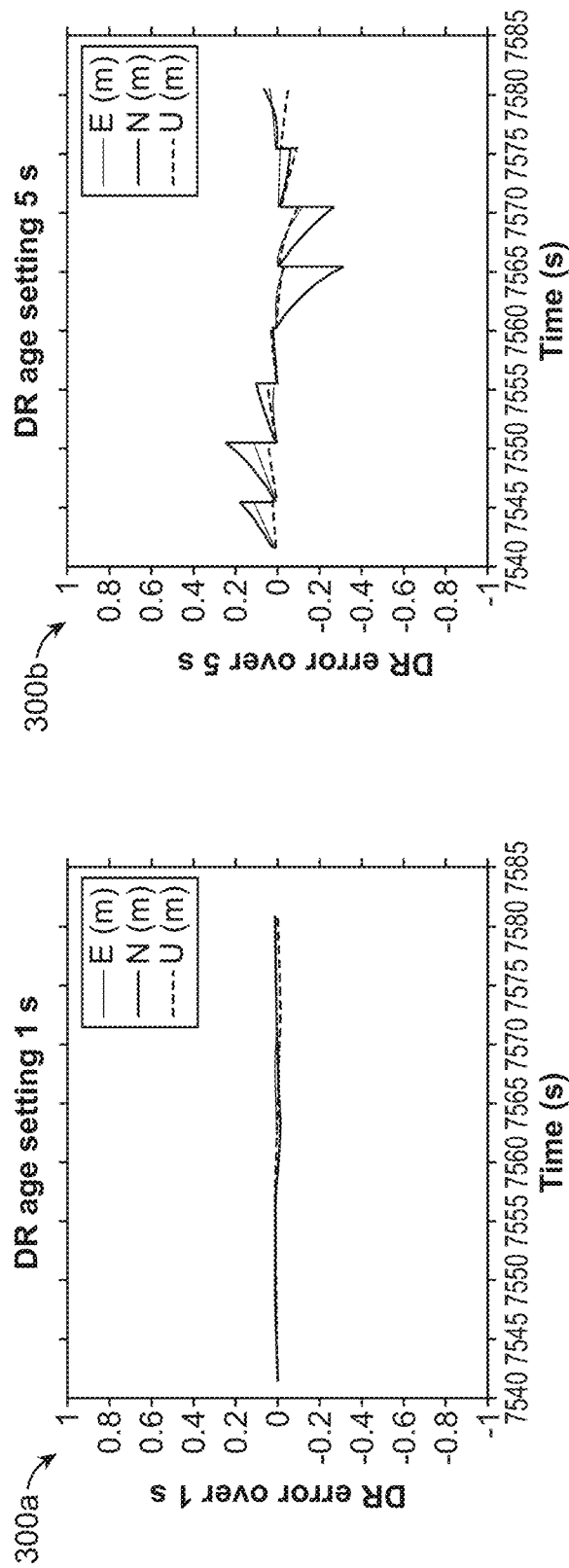
FIG. 3A is a graph illustrating an example dead reckoning (DR) error for a DR age setting of one second, in accordance with some examples.
FIG. 3B is a graph illustrating an example dead reckoning (DR) error for a DR age setting of five seconds, in accordance with some examples.
Figures 3C, 3D:
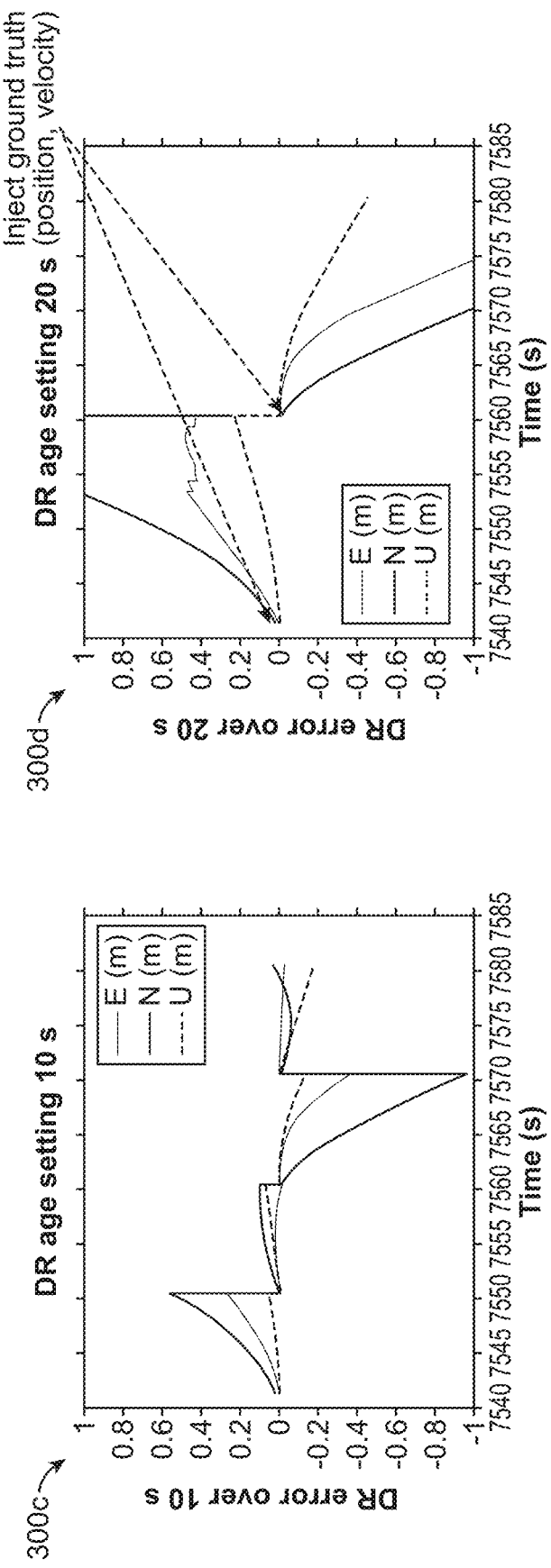
FIG. 3C is a graph illustrating an example dead reckoning (DR) error for a DR age setting of 10 seconds, in accordance with some examples.
FIG. 3D is a graph illustrating an example dead reckoning (DR) error for a DR age setting of 20 seconds, in accordance with some examples.

FIGS. 3A-3D are graphs depicting examples of IMU performance (e.g., dead reckoning error rate) over time for different dead reckoning (DR) age settings, where the DR age setting represents the elapsed time between successive ground truth inputs provided to the IMU/dead reckoning calculation. For example, FIG. 3A depicts a graph 300a of an example of DR error rate for a one second DR age, wherein a new ground truth (position, velocity) input is provided to the dead reckoning calculation every second. FIG. 3B depicts a graph 300b of an example of DR error rate for a five second DR age; FIG. 3C depicts a graph 300c of an example of DR error rate for a 10 second DR age; and FIG. 3D depicts a graph 300d of an example of DR error rate for a 20 second DR age.

As can be seen in FIGS. 3A-D, the DR error rate (e.g., vertical axis) grows with the DR age, or the elapsed time since the last ground truth initialization input was provided to the IMU or dead reckoning calculation. In FIG. 3A, the one second DR age setting is associated with a minimal DR error rate in all three dimensions (e.g., East, North, and Up). In FIGS. 3B-D, the DR error rate can be seen to increase with the DR age setting and to increase with the DR age (e.g., elapsed time) within each of the individual DR age setting windows (e.g., the 5, 10, and 20 second windows, respectively, at which ground-truth position and velocity information is used to re-initialize the dead reckoning calculation).

In one illustrative example, position and velocity information can be injected or otherwise provided to the IMU from an electronic device associated with one or more of the IMU, the RTK positioning system, the PPE, and/or the GNSS receiver. As mentioned previously, in some examples the IMU, RTK positioning system, PPE, and GNSS receiver can be included in or associated with the same electronic device or object. In some cases, the position and/or velocity information can be obtained from the RTK positioning system, the PPE, and/or the GNSS receiver. In some cases, the position and/or velocity information can be obtained based at least in part on one or more measured or determined values obtained from the RTK positioning system, PPE and/or GNSS receiver. In some examples, the position and/or velocity information can be obtained or derived from the electronic device using components other than the RTK positioning system, PPE and/or GNSS receiver.

In some examples, the injected position and velocity information can be the position and velocity information determined immediately before the GNSS signal outage occurred (e.g., before accurate RTK position and velocity information was lost due to GNSS signal outage). When the RTK position and/or velocity information prior to GNSS signal outage is associated with a centimeter or decimeter level accuracy, the subsequent IMU-based dead reckoning position information (e.g., determined following the GNSS signal outage and using the RTK position and velocity information) can also achieve a same or similar level of accuracy for short DR ages.

In some cases, the IMU-based dead reckoning position information may be associated with a decrease in accuracy over time (e.g., relative to the initial or ground truth starting position provided to the IMU-based dead reckoning). For example, as depicted in FIGS. 3C and 3D (illustrating DR age settings of 10 seconds and 20 seconds, respectively), in some cases the DR error associated with the determined position can reach or exceed one meter, which can be below the accuracy level associated with RTK positioning and/or GNSS-only based positioning.

The DR error rate can be based on an accumulation of error in one or more of the IMU measurements that are used to perform dead reckoning. For example, each measurement obtained from the IMU accelerometer, gyroscope, and/or magnetometer can be associated with an error rate or uncertainty. As dead reckoning is performed over time, the error rate or uncertainty associated with each IMU sensor measurements accumulates into the output position that is determined for each of the iterative dead reckoning steps. Based on this accumulation of error, the determined or output position of an IMU-based dead reckoning technique can drift from the ground truth or actual position of the IMU. Because the drift in IMU-based dead reckoning is based on the accumulation of error over time, the accuracy of IMU-based dead reckoning can increase with shorter DR age and with smaller DR age settings, as illustrated in FIGS. 3A-D.

Error can accumulate at different rates for the different 3D position components when using IMU-based dead reckoning. For example, as depicted in FIGS. 3A-D, the different 3D position components are East, North, and Up, although it is noted that other coordinate systems and/or position components can be utilized without departing from the scope of the present disclosure. In one illustrative example, the 'Up' position component or direction accumulates error at a slower rate than either the 'East' position component or the 'North' position component. This can be based on the IMU moving through a larger distance or displacement in the East and North directions than in the Up direction (e.g., driving or walking can be associated with movement in primarily horizontal directions rather than vertical directions).

Figure 4:
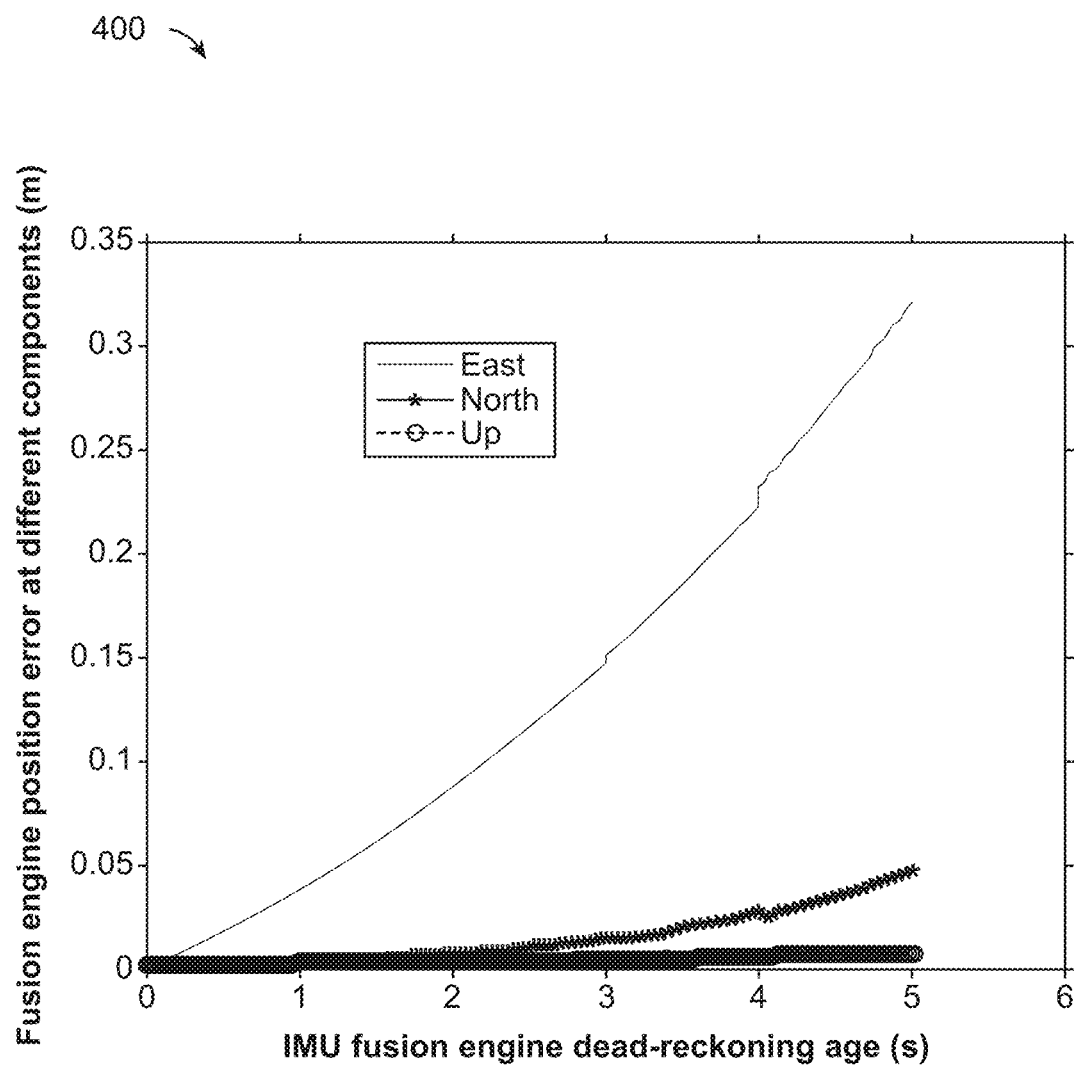
FIG. 4 is a graph illustrating an example inertial measurement unit (IMU) position drift error, in accordance with some examples.

FIG. 4 is a graph 400 depicting an example of IMU position error over time for East, North, and Up directional components of the resultant IMU or dead reckoning based position determination. In the example of FIG. 4, the IMU position error grows relatively rapidly in the East direction, moderately in the North direction, and minimally in the Up direction. For example, the IMU position error depicted in graph 400 may be associated with a physical movement of an associated IMU (e.g., the IMU used to perform dead reckoning) that occurred primarily in the East direction. Although not depicted, in some examples the IMU position error could be largest in the North direction if the associated IMU was physically moved along a path primarily oriented in a North-South direction.

As illustrated, the IMU position error for the Up directional component can remain below 0.05 meters for a DR age in excess of five seconds. In some examples, IMU position error in the Up directional component can remain below 0.05 meters for DR ages of 20 seconds or more, maintaining a centimeter level accuracy or greater for periods of time beyond that in which the two horizontal directional components (e.g., East and North) maintain centimeter level accuracy.

In one illustrative example, the systems and techniques described herein can use an IMU fusion engine to provide one or more dynamic position constraints to an RTK positioning system (also referred to as an RTK engine). The IMU fusion engine can provide dynamic position constraints that are determined based on a DR age or elapsed time from the beginning of a GNSS or other positioning signal outage. For example, the IMU fusion engine can provide a full 3D position constraint to the RTK engine while the DR age remains relatively short and the IMU fusion engine position accuracy remains relatively high in all three directions. In some examples, the IMU fusion engine can provide a partial 3D position constraint to the RTK engine when the DR age exceeds a pre-determined threshold. Additionally, or alternatively, the IMU fusion engine can provide a partial 3D position constraint to the RTK engine when an uncertainty for one or more of the 3D directional components of the IMU-determined position exceeds a pre-determined threshold.

For example, the IMU fusion engine can provide the partial 3D position constraint based on the height component of the IMU-determined position, which may accumulate error or positional drift at a lower rate than the East and/or North horizontal directional components of the IMU-determined position. For example, the partial 3D position constraint can be an IMU height constraint generated using an IMU inertial height measurement. By generating a dynamic position constraint for the RTK engine to include only the 3D directional components of the IMU-determined position that are below an uncertainty threshold, the systems and techniques described herein can provide an improved position determination accuracy during GNSS signal outage and/or during an outage or unavailability of one or more positioning signals other than GNSS signals. In some examples, by providing only a height constraint to the RTK engine when the DR age becomes relatively large and/or the East and North horizontal directional components exceed an uncertainty threshold, the systems and techniques described herein can provide improved position determination accuracy for GNSS signal outages of increased duration.

In one illustrative example, the dynamic IMU position constraint and/or the dynamic IMU height constraint described herein can be generated based on one or more position movements and/or displacements determined in each dimension of the IMU coordinate system. For example, the IMU fusion engine can perform dead reckoning to determine a series of (latitude, longitude, height) delta values, wherein the delta values represent a change (e.g., delta) between consecutive steps of the IMU fusion engine and/or IMU-based dead reckoning process.

In some cases, the IMU coordinate system can be different from the coordinate system utilized by the RTK engine and/or one or more of the PPE, GNSS receiver, etc. For example, the RTK engine can output position information determined in a Cartesian (x, y, z) coordinate system having its origin at the center of the Earth. The same Cartesian coordinate system can be used by the PPE, GNSS receiver, one or more GNSS satellites, RTK base stations, etc. The IMU coordinate system can be a geographic coordinate system based on (latitude, longitude, height) coordinates.

In some examples, a transition matrix T can be used to convert between the Cartesian coordinate system of the RTK engine and the geographic coordinate system of the IMU fusion engine, such that the IMU fusion engine's output in geographic coordinates can be utilized as an IMU constraint input in Cartesian coordinates to the RTK engine. For example, for a given set of IMU geographic coordinate delta values, the transition matrix T can be used to obtain corresponding Cartesian coordinate delta values as the matrix multiplication product given below:

$$\begin{bmatrix} \delta Lat \\ \delta Long \\ \delta H \end{bmatrix} = T \begin{bmatrix} \delta X \\ \delta Y \\ \delta Z \end{bmatrix}$$

Here, $\delta Lat$ represents the device (e.g., the device that includes or is associated with the IMU, IMU fusion engine, RTK engine, etc.) position movement in the latitude direction; $\delta Long$ represents the device position movement in the longitude direction; and $\delta H$ represents the device position movement in the height direction. In some examples, each of the geographic coordinate delta values $\delta Lat$, $\delta Long$, $\delta H$ can be obtained from or otherwise determined using the IMU fusion engine. As mentioned previously, T represents the transition matrix for converting between geographic coordinates and Cartesian coordinates. $\delta X$ represents the device position movement in the x-axis of the Cartesian coordinate system; $\delta Y$ represents the device position movement in the y-axis of the Cartesian coordinate system; and $\delta Z$ represents the device position movement in the z-axis of the Cartesian coordinate system. In some examples, the transition matrix T can be a 3×3 conversion matrix to convert the position movement from Cartesian coordinates to geographic coordinates (or vice versa, using the inverse of T).

In one illustrative example, the RTK engine can use one or more Kalman filters to determine a position estimate at each time step or epoch (e.g., the RTK solution can be obtained from a Kalman filter estimation). In normal operation in the absence of a GNSS signal outage, the Kalman filter estimation can take as input the position estimate from the previous time step or epoch. In the absence of a GNSS signal outage, the position estimate from the previous time step or epoch can be obtained from the measured GNSS signal(s) and the RTK base correction information received at the RTK engine, and there may be no dependency on IMU information. When a GNSS signal outage occurs, accurate position estimates may no longer be available from the RTK engine alone (e.g., when the RTK engine relies upon only pseudo-range measurements or is unable to generate a position estimation at all). In such scenarios, the IMU information (e.g., the IMU DR-based coordinate or position information) can be provided as input to the RTK engine Kalman filter. In some examples, the IMU information (e.g., height constraint and/or three-dimensional (3D) inertial position measurement) can be used as a real-time kinematic (RTK) positioning input to a Kalman filter associated with the RTK engine.

For example, the conversion matrix T can be applied to the IMU geographic coordinate delta values $\delta Lat$, $\delta Long$, $\delta H$ to obtain the Cartesian coordinate delta values $\delta X$, $\delta Y$, $\delta Z$, as described above. One or more of the Cartesian coordinate delta values can then be provided as input (e.g., a real-time kinematic (RTK) positioning input) to the Kalman filter estimation and used to perform an additional update (e.g., generate a position estimate for the current time step or epoch) even if inaccurate RTK position information is available and/or if no RTK position information is available. In some cases, one or more of the Cartesian coordinate delta values can be used as a Cartesian coordinate position input to the Kalman filter. In some examples, the conversion matrix T can be used as a design matrix of the Kalman filter. For example, when a full IMU 3D position constraint is applied, the Kalman filter design matrix can include all three rows of the 3×3 conversion matrix T When a partial IMU constraint (e.g., IMU height constraint) is applied, the Kalman filter design matrix can include only the row of the 3×3 conversion matrix T that corresponds to the height values, e.g., in the example given above, T(3, :). In some examples, the input of positioning information and/or one or more height constraints to the Kalman filter can also be referred to as a measurement update. The Kalman filter can utilize the measurement update to determine or update one or more of a position measurement (e.g., as mentioned above), a clock measurement or term, an inter-satellite-type bias (ISTB) measurement or term, an ambiguities measurement or term, etc.

As described above, in some cases a full IMU 3D position constraint can be applied to the RTK engine (e.g., provided as input to the RTK engine Kalman filter) when the IMU DR age is below a first threshold (e.g., 10 seconds) and/or when the IMU fusion engine uncertainty is below a second threshold (e.g., 0.1 meters). The full IMU 3D position constraint can be applied by using the full 3×3 conversion matrix T to obtain the three δX, δY, δZ coordinate delta values for each of the three geographic coordinate delta values δLat, δLong, δH. Because the two coordinate systems are different, a delta value in a single dimension of the geographic coordinate system can contain components along multiple (or all) dimensions of the Cartesian coordinate system. For example, the δX value in the full IMU 3D position constraint can be determined as the sum of the contributions along the Cartesian coordinate system x-axis from the geographic coordinate system δLat delta value, the geographic coordinate system δLong delta value, and the geographic coordinate system δH delta value.

In some examples, a partial IMU constraint (e.g., IMU height constraint only) can be applied to the RTK engine (e.g., provided as input to the RTK engine Kalman filter) when the IMU DR age is above the first threshold (e.g., 10 seconds) and/or when the IMU fusion engine uncertainty is above a second threshold (e.g., 0.1 meters). The IMU height constraint can be applied by using the row of the 3×3 conversion matrix T that corresponds to the geographic coordinate system height values. In one illustrative example, the IMU height constraint can be determined as a pseudo-measurement that includes one or more of a δX delta value, δY delta value, and/or δZ delta value. For example, the IMU height constraint pseudo-measurement can be determined as the matrix multiplication product:

$$[\delta H] = T(3,:) \begin{bmatrix} \delta X \\ \delta Y \\ \delta Z \end{bmatrix}$$

A similar approach can be used to determine a full IMU 3D position constraint pseudo-measurement that can be applied to the RTK engine Kalman filter when the IMU DR age is young (e.g., below the first threshold) and/or when the IMU DR uncertainty is relatively small (e.g., below the second threshold).

FIG. 5A depicts an example graph 500a of position error over time for an example scenario in which an RTK engine experiences a GNSS signal outage at a point (e.g., a point in time) 510 and determines position information without IMU fusion engine input. In some examples, the position error depicted in graph 500a can be determined as the position error between an RTK engine position output and the corresponding ground truth position. It is noted that although reference is made to RTK position information obtained from an RTK engine, position information can also be obtained from a GNSS-based PPE system and/or other wireless positioning system.

As illustrated in FIG. 5A, the position error may initially be minimal, and a centimeter or decimeter level accuracy can be achieved (e.g., from t=7235 to t=7250 on the horizontal axis). As illustrated, position error can begin to grow beginning at point 510 (e.g., approximately t=7250 on the horizontal axis), which in one illustrative example can represent a GNSS signal outage to the RTK engine.

In some examples, prior to the point 510 at which a GNSS signal outage occurs, position information can be determined as the RTK engine output, using one or more locally measured GNSS signals and one or more RTK base corrections received from a base station. For example, the RTK engine can calculate position information by applying the RTK base corrections to the measured GNSS signals. The RTK base corrections can include one or more position and/or error corrections determined based on a pseudo-range measurement and carrier phase measurement (e.g., as described previously with respect to Eqs. (1) and (2)).

When the GNSS signal outage occurs at point 510, the RTK engine may no longer receive at least a portion of the RTK base corrections. For example, the GNSS signal outage may cause the RTK engine to receive only a portion of the carrier phase measurement and/or may cause the RTK engine to receive no carrier phase measurements. In some examples, the GNSS signal outage associated with point 510 can be associated with the RTK engine losing track of one or more carrier-phase measurements, such that the RTK engine can no longer determine or perform the carrier-phase correction of Eq. (2).

In some examples, after the GNSS signal outage at point 510 the RTK engine may be unable to obtain carrier-phase measurements or otherwise determine carrier-phase corrections and determines position information using only the pseudo-range measurement of Eq. (1). In some cases, the loss of carrier-phase measurements and/or corrections due to the GNSS signal outage at point 510 can be associated with a degradation in position accuracy, as shown in graph 500a. As illustrated, the RTK engine position accuracy can rapidly degrade, with the position error shown on the vertical axis rapidly increasing to greater than one meter. In some examples, the RTK engine position error can continue to increase (and the RTK engine position accuracy can continue to decrease) until the GNSS signal outage ends. For example, graph 500a depicts the position error beginning to decrease at approximately t=7270, with approximately centimeter-level accuracy restored by approximately t=7275.

FIG. 5B is an example graph 500b illustrating the position error over time for an example scenario in which one or more dynamic IMU-based position constraints are provided as input to the RTK engine of FIG. 5A. In one illustrative example, the position error depicted in FIG. 5A and the position error depicted in FIG. 5B can be determined for the same underlying GNSS signal outage and the same underlying movement (e.g., graph 500a and graph 500b can be generated from the same environmental conditions).

Figure 5C:
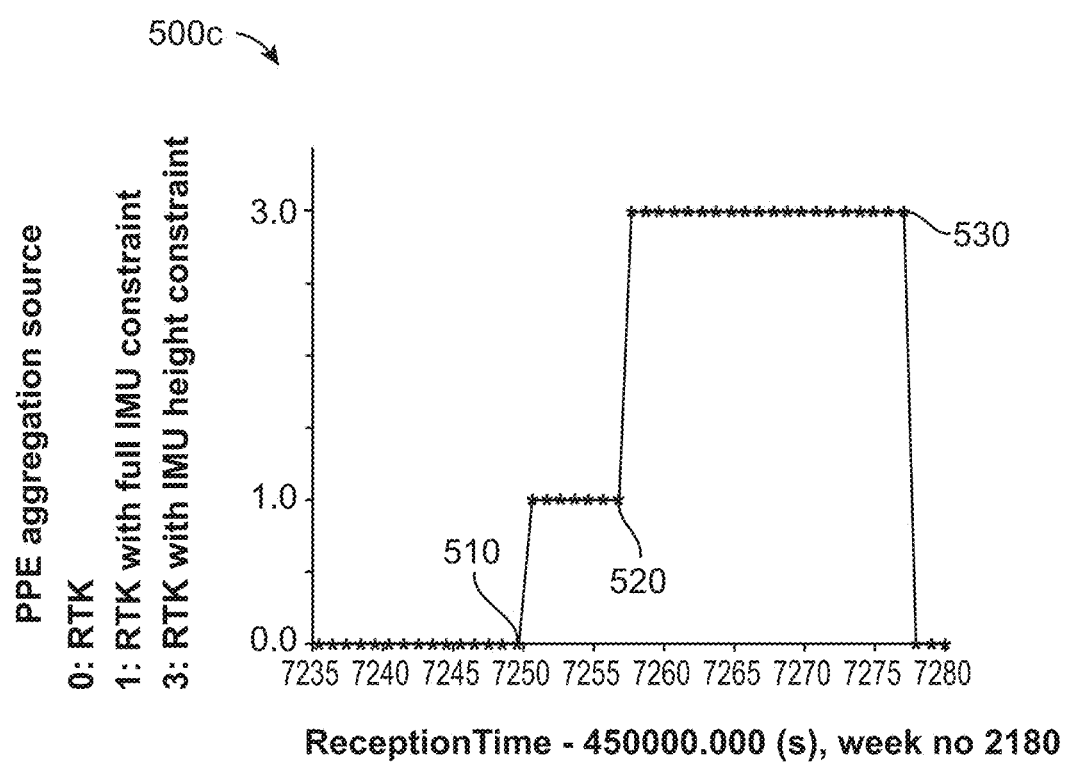
FIG. 5C is a graph illustrating an example of precision positioning engine (PPE) aggregation sources during a positioning signal outage, in accordance with some examples.

Also illustrated in FIG. 5C is a graph 500c depicting the PPE aggregation source used to perform positioning. Prior to the GNSS signal outage at point 510 (e.g., from approximately time t=7235 to t=7250), the PPE aggregation source is shown as the RTK engine. When the PPE aggregation source is the RTK engine, position information can be determined using the RTK engine only (e.g., without using the IMU-based dynamic position constraints described herein), as described above. After the GNSS signal outage at point 510, the PPE aggregation source can initially be the RTK engine with a full IMU position constraint applied. The full IMU position constraint can be a full 3D position constraint applied to each of the directional components of the determined position information (e.g., East, North, and Up).

The full IMU position constraint can be provided as input to the RTK engine while the IMU DR age remains relatively low (e.g., below 10 seconds) and/or while the IMU fusion engine uncertainty remains below a threshold (e.g., uncertainty less than 0.1 m), although it is noted that other values and/or thresholds can be used for the IMU DR age and the IMU fusion engine uncertainty.

At point 520, depicted in FIGS. 5B and 5C as occurring at approximately t=7257, the PPE aggregation source can switch to the RTK engine with a partial position constraint applied. In one illustrative example, the partial position constraint can be an IMU height constraint. As illustrated in FIG. 5B, the growth rate of the position error can be reduced based on the use of the IMU height constraint instead of the full IMU constraint (e.g., the full 3D IMU position constraint with East, North, and Up directional components). In some examples, the IMU height constraint can continue being applied to the RTK engine until the GNSS signal outage is resolved at point 530 (e.g., at approximately t=7277).

As depicted in FIG. 5B, the use of the full 3D IMU position constraint can be associated with a position error that is initially associated with approximately centimeter level accuracy (e.g., near point 510 when the full 3D IMU position constraint is first applied) and grows to approximately meter level accuracy (e.g., a 0.5 m position error near point 520, from which only the IMU height constraint is then applied).

Additionally, as depicted in FIG. 5B, the RTK engine can use the IMU height constraint to perform positioning with a reduced position error in all three dimensions or directions. For example, beginning at point 520, the time at which only the IMU height constraint is used rather than the full 3D IMU position constraint, each of the East, North, and Up position errors are reduced compared to the corresponding position error depicted in FIG. 5A (e.g., which is determined by the RTK engine without using IMU fusion engine information or IMU constraints). By using only the IMU height constraint once the IMU DR age exceeds a first threshold (e.g., 10 seconds) and/or the IMU fusion engine uncertainty exceeds a second threshold (e.g., 0.1 meters), the RTK engine can determine position information with reduced error in all three dimensions, and can continue to do so in a stable manner that does not exhibit rapid drift of error increase with the IMU DR age.

Figure 6:
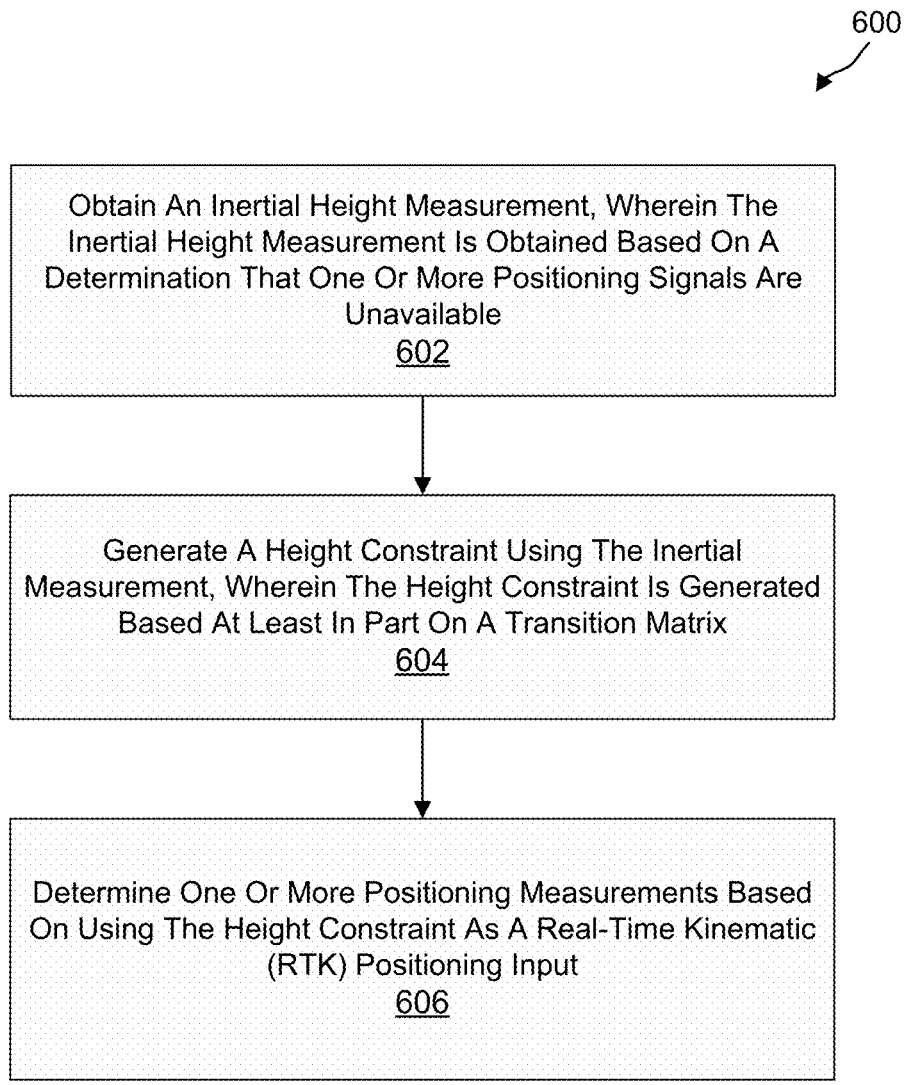
FIG. 6 is a flow diagram illustrating an example of a process for determining positioning, in accordance with some examples.

FIG. 6 is a flowchart illustrating an example of a process 600 for determining positioning. At block 602, the process 600 includes obtaining an inertial height measurement, wherein the inertial height measurement is obtained based on a determination that one or more positioning signals are unavailable. For example, the inertial height measurement can be obtained from an inertial measurement unit (IMU), which can be included in or associated with the user equipment (UE) 105 illustrated in FIG. 1. In some examples, the inertial height measurement can be obtained (e.g., from an IMU) based on a determination that one or more RTK positioning signals are unavailable. In some cases, the one or more RTK positioning signals can be associated with an RTK positioning system and/or an RTK base station. For example, the inertial height measurement can be obtained (e.g., from an IMU) based on a determination that one or more RTK positioning signals are unavailable, wherein the one or more RTK positioning signals are associated with one or more of the GNSS satellites 110, the base stations 120, and/or access points (APs) 130 illustrated in FIG. 1. The one or more RTK positioning signals can additionally, or alternatively, be associated with one or more of the GNSS satellites 230 and/or the GNSS receiver 210 illustrated in FIG. 2. In some examples, the inertial height measurement can be obtained (e.g., from an IMU) based on a determination that one or more RTK carrier-phase measurements were not received.

In some examples, the inertial height measurement can be obtained from an IMU based on one or more of a determination that a dead reckoning (DR) age associated with the IMU is above a first threshold, or a determination that an uncertainty associated with the IMU is above a second threshold. As mentioned previously, in some cases the IMU can be included in or associated with the UE 105 illustrated in FIG. 1. In some examples, the inertial height measurement is a delta value determined between successive dead reckoning steps of the IMU.

At block 604, the process 600 includes generating a height constraint using the inertial height measurement, wherein the height constraint is generated based at least in part on a transition matrix. For example, the inertial height measurement can include an inertial height value in a first coordinate system and the height constraint can be generated to include one or more coordinate values in a second coordinate system. The one or more coordinate values in the second coordinate system of the height constraint can be generated as a matrix multiplication product between the inertial height value and a portion of the transition matrix associated with a height dimension of the first coordinate system.

For example, in some cases the inertial height measurement can be a delta value determined between successive dead reckoning steps of the IMU. The height constraint can be generated to include one or more Cartesian coordinate delta values, wherein the height constraint is generated by using at least a portion of the transition matrix to project the inertial height measurement delta value along each dimension of the Cartesian coordinate system. For example, the inertial height measurement delta value can be a single value corresponding to a height dimension of a geographic coordinate system associated with the inertial measurements (e.g., from the IMU). The transition matrix, or at least a portion thereof, can be used to project the single inertial height measurement delta value (e.g., representing a single dimension of the geographic coordinate system of the IMU) into or along each of the three dimensions of a Cartesian coordinate system, thereby generating three Cartesian coordinate delta values from the single inertial height measurement delta value.

In some examples, an inertial height measurement can be obtained from a three-dimensional (3D) inertial position measurement (e.g., obtained using an IMU included in or associated with UE 105 illustrated in FIG. 1). The 3D inertial position measurement can include the inertial height measurement as one of the three inertially measured dimensions. For example, the inertial height measurement can be included in the 3D inertial position measurement along with an inertial x-direction measurement and an inertial y-direction measurement (e.g., with the inertial height measurement representing the inertial z-direction measurement). In some examples, a 3D inertial position measurement can be obtained based on a determination that the DR age associated with the IMU is below the first threshold or based on a determination that the uncertainty associated with the IMU is below the second threshold. IN some cases, the first threshold for the DR age can be approximately 5-10 seconds, although other DR age values can also be utilized. In some examples, the second threshold for uncertainty can be approximately 10%, although other uncertainty values can also be utilized. In some examples, a 3D inertial position measurement can be used to generate a 3D position constraint at block 604, wherein the 3D position constraint is generated by applying a transition matrix to the 3D inertial position measurement.

At block 606, the process 600 includes determining one or more positioning measurements based on using the height constraint as a real-time kinematic (RTK) positioning input. For example, the height constraint can be used as an RTK positioning input to one or more positioning systems associated with UE 105 illustrated in FIG. 1. In some examples, the height constraint can be used as an RTK positioning input to one or more positioning systems that are additionally, or alternatively, associated with one or more of the GNSS satellites 110 illustrated in FIG. 1 and/or the GNSS satellites 230 illustrated in FIG. 2.

In some examples, a 3D inertial position measurement can be used to generate a 3D position constraint at block 604, wherein the 3D position constraint is generated by applying a transition matrix to the 3D inertial position measurement (e.g., as described above). In some cases, the one or more positioning measurements can be determined at block 606 based on using the 3D position constraint as an RTK positioning input. In some cases, the one or more positioning measurements can be determined based on using the 3D position constraint as an RTK measurement input.

In some examples, determining the one or more positioning measurements can include using the height constraint as a measurement update to a Kalman filter. For example, the height constraint can be generated by using at least a portion of the transition matrix to project the inertial height measurement along each dimension of a Cartesian coordinate system (e.g., as described above), and the height constraint generated using the transition matrix can subsequently be provided as measurement update input to a Kalman filter for determining the one or more positioning measurements.

In some examples, a 3D inertial position measurement can be a geographic coordinate that includes the inertial height measurement, a first inertial horizontal displacement, and a second inertial horizontal displacement. For example, the first inertial horizontal displacement can be in a x-direction and the second inertial horizontal displacement can be in a y-direction. The 3D position constraint (e.g., generated based on the 3D inertial position measurement geographic coordinate) can be generated as a Cartesian coordinate, using the transition matrix as described above. For example, the transition matrix can be used to project the inertial height measurement into a first set of Cartesian coordinates. The transition matrix can additionally be used to project the first inertial horizontal displacement measurement into a second set of Cartesian coordinates, and to project the second inertial horizontal displacement measurement into a third set of Cartesian coordinates. The first, second and third sets of Cartesian coordinates can be combined to generate the 3D position constraint. In some examples, determining the one or more positioning measurements includes subsequently using the 3D position constraint as a measurement update to a Kalman filter.

In some examples, the processes described herein (e.g., process 600 and/or any other process described herein) may be performed by a computing device, apparatus, or system. In one example, the process 600 can be performed by a computing device or system having the computing device architecture 700 of FIG. 7. The computing device, apparatus, or system can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a laptop computer, a smart television, a camera, and/or any other computing device with the resource capabilities to perform the processes described herein, including the process 600 and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 600 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 600 and/or any other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 7:
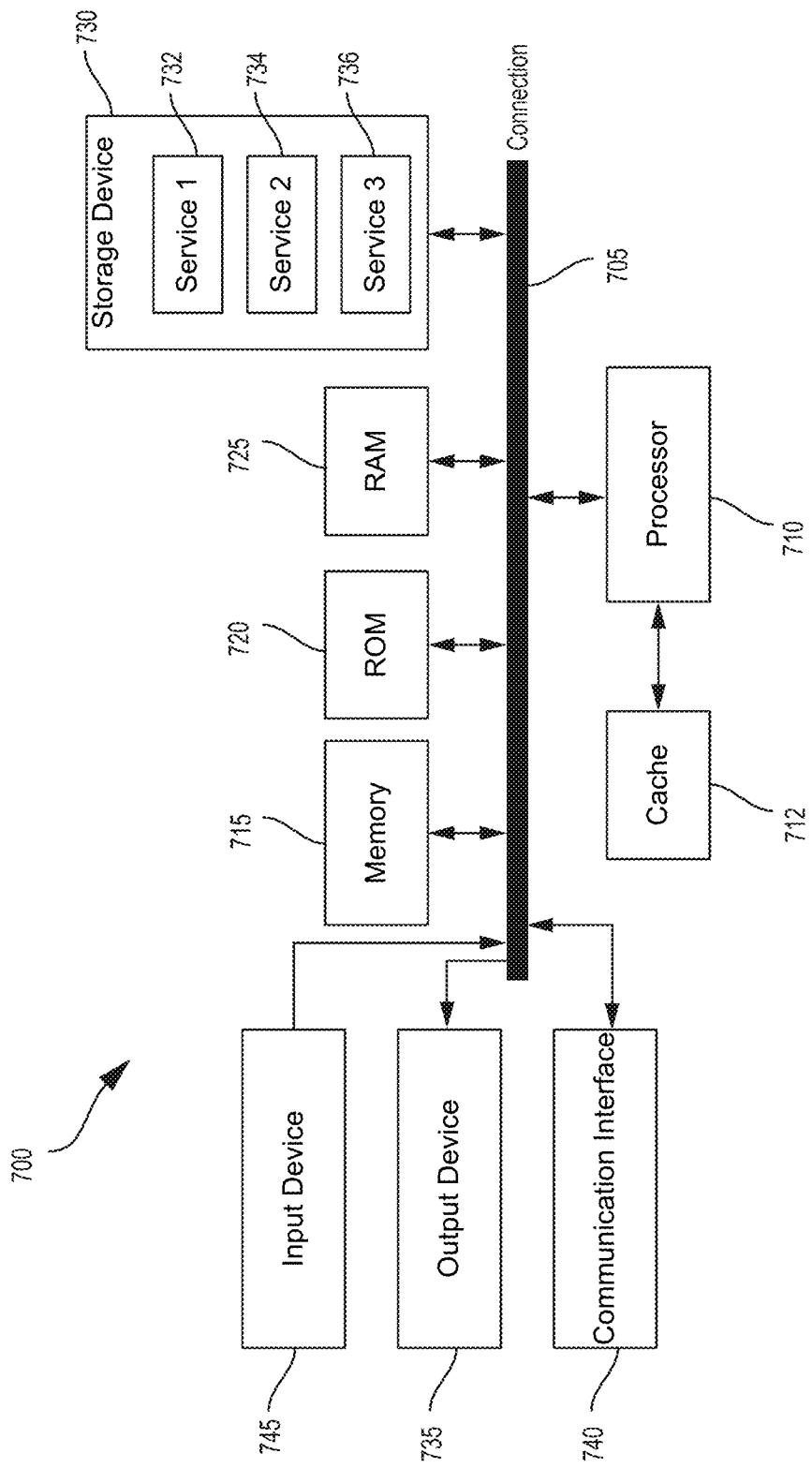
FIG. 7 is a block diagram illustrating an example of a computing system for implementing certain aspects described herein.

FIG. 7 illustrates an example computing device architecture 700 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. The components of computing device architecture 700 are shown in electrical communication with each other using connection 705, such as a bus. The example computing device architecture 700 includes a processing unit (CPU or processor) 710 and computing device connection 705 that couples various computing device components including computing device memory 715, such as read only memory (ROM) 720 and random-access memory (RAM) 725, to processor 710.

Computing device architecture 700 can include a cache of high-speed memory connected directly with, in close proximity to, or integrated as part of processor 710. Computing device architecture 700 can copy data from memory 715 and/or the storage device 730 to cache 712 for quick access by processor 710. In this way, the cache can provide a performance boost that avoids processor 710 delays while waiting for data. These and other engines can control or be configured to control processor 710 to perform various actions. Other computing device memory 715 may be available for use as well. Memory 715 can include multiple different types of memory with different performance characteristics. Processor 710 can include any general-purpose processor and a hardware or software service, such as service 1 732, service 2 734, and service 3 736 stored in storage device 730, configured to control processor 710 as well as a special-purpose processor where software instructions are incorporated into the processor design. Processor 710 may be a self-contained system, containing multiple cores or processors, a bus, memory controller, cache, etc. A multi-core processor may be symmetric or asymmetric.

To enable user interaction with the computing device architecture 700, input device 745 can represent any number of input mechanisms, such as a microphone for speech, a touch-sensitive screen for gesture or graphical input, keyboard, mouse, motion input, speech and so forth. Output device 735 can also be one or more of a number of output mechanisms known to those of skill in the art, such as a display, projector, television, speaker device, etc. In some instances, multimodal computing devices can enable a user to provide multiple types of input to communicate with computing device architecture 700. Communication interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. Storage device 730 can include services 732, 734, 736 for controlling processor 710. Other hardware or software modules or engines are contemplated. Storage device 730 can be connected to the computing device connection 705. In one aspect, a hardware module that performs a particular function can include the software component stored in a computer-readable medium in connection with the necessary hardware components, such as processor 710, connection 705, output device 735, and so forth, to carry out the function.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, an engine, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, engines, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1: A method for determining positioning, comprising: obtaining an inertial height measurement, wherein the inertial height measurement is obtained based on a determination that one or more positioning signals are unavailable; generating a height constraint using the inertial height measurement, wherein the height constraint is generated based at least in part on a transition matrix; and determining one or more positioning measurements based on using the height constraint as a real-time kinematic (RTK) positioning input.

Aspect 2: The method of Aspect 1, wherein: the inertial height measurement is obtained from an inertial measurement unit (IMU); and the inertial height measurement is obtained based on one or more of a determination that a dead reckoning (DR) age associated with the IMU is above a first threshold or a determination that an uncertainty associated with the IMU is above a second threshold.

Aspect 3: The method of Aspect 2, further comprising: obtaining a three-dimensional (3D) inertial position measurement, wherein the 3D inertial position measurement includes the inertial height measurement and is obtained based on a determination that the DR age associated with the IMU is below the first threshold or a determination that the uncertainty associated with the IMU is below the second threshold; generating a 3D position constraint using the 3D inertial position measurement, wherein the 3D position constraint is generated by applying the transition matrix to the 3D inertial position measurement; and determining one or more positioning measurements based on using the 3D position constraint as an RTK positioning input.

Aspect 4: The method of Aspect 3, wherein: the 3D inertial position measurement is a geographic coordinate including the inertial height measurement, a first inertial horizontal displacement measurement, and a second inertial horizontal displacement measurement; the 3D position constraint is a Cartesian coordinate; and determining the one or more positioning measurements includes using the 3D position constraint as a measurement update to a Kalman filter.

Aspect 5: The method of Aspect 4, further comprising: using the transition matrix to project the inertial height measurement into a first set of Cartesian coordinates, to project the first inertial horizontal displacement measurement into a second set of Cartesian coordinates, and to project the second inertial horizontal displacement measurement into a third set of Cartesian coordinates; and combining the first set of Cartesian coordinates, the second set of Cartesian coordinates, and the third set of Cartesian coordinates to generate the 3D position constraint.

Aspect 6: The method of any of Aspects 2 to 5, wherein: the inertial height measurement is a delta value determined between successive dead reckoning steps of the IMU; and the height constraint includes one or more Cartesian coordinate delta values generated by using at least a portion of the transition matrix to project the inertial height measurement delta value along each dimension of a Cartesian coordinate system.

Aspect 7: The method of any of Aspects 1 to 6, wherein: the inertial height measurement includes an inertial height value in a first coordinate system; and the height constraint includes one or more coordinate values in a second coordinate system, wherein the one or more coordinate values in the second coordinate system are generated as a matrix multiplication product between the inertial height value and a portion of the transition matrix associated with a height dimension of the first coordinate system.

Aspect 8: The method of any of Aspects 1 to 7, further comprising: generating the height constraint by using at least a portion of the transition matrix to project the inertial height measurement along each dimension of a Cartesian coordinate system; and determining the one or more positioning measurements includes using the height constraint as a measurement update to a Kalman filter.

Aspect 9: The method of any of Aspects 1 to 8, wherein the inertial height measurement is obtained based on a determination that one or more RTK positioning signals are unavailable.

Aspect 10: The method of any of Aspects 1 to 9, wherein the inertial height measurement is obtained based on a determination that one or more RTK carrier-phase measurements were not received.

Aspect 11: An apparatus for determining positioning, the apparatus comprising: at least one transceiver; at least one memory; and at least one processor coupled to the at least one transceiver and the at least one memory and configured to: obtain an inertial height measurement, wherein the inertial height measurement is obtained based on a determination that one or more positioning signals are unavailable; generate a height constraint using the inertial height measurement, wherein the height constraint is generated based at least in part on a transition matrix; and determine one or more positioning measurements based on using the height constraint as a real-time kinematic (RTK) positioning input.

Aspect 12: The apparatus of Aspect 11, wherein: the inertial height measurement is obtained from an inertial measurement unit (IMU); and the inertial height measurement is obtained based on one or more of a determination that a dead reckoning (DR) age associated with the IMU is above a first threshold or a determination that an uncertainty associated with the IMU is above a second threshold.

Aspect 13: The apparatus of Aspect 12, wherein the at least one processor is configured to: obtain a three-dimensional (3D) inertial position measurement, wherein the 3D inertial position measurement includes the inertial height measurement and is obtained based on a determination that the DR age associated with the IMU is below the first threshold or a determination that the uncertainty associated with the IMU is below the second threshold; generate a 3D position constraint using the 3D inertial position measurement, wherein the 3D position constraint is generated by applying the transition matrix to the 3D inertial position measurement; and determine one or more positioning measurements based on using the 3D position constraint as an RTK positioning input.

Aspect 14: The apparatus of Aspect 13, wherein: the 3D inertial position measurement is a geographic coordinate including the inertial height measurement, a first inertial horizontal displacement measurement, and a second inertial horizontal displacement measurement; the 3D position constraint is a Cartesian coordinate; and determining the one or more positioning measurements includes using the 3D position constraint as a measurement update to a Kalman filter.

Aspect 15: The apparatus of Aspect 14, wherein the at least one processor is configured to: use the transition matrix to project the inertial height measurement into a first set of Cartesian coordinates, to project the first inertial horizontal displacement measurement into a second set of Cartesian coordinates, and to project the second inertial horizontal displacement measurement into a third set of Cartesian coordinates; and combine the first set of Cartesian coordinates, the second set of Cartesian coordinates, and the third set of Cartesian coordinates to generate the 3D position constraint.

Aspect 16: The apparatus of any of Aspects 12 to 15, wherein: the inertial height measurement is a delta value determined between successive dead reckoning steps of the IMU; and the height constraint includes one or more Cartesian coordinate delta values generated by using at least a portion of the transition matrix to project the inertial height measurement delta value along each dimension of a Cartesian coordinate system.

Aspect 17: The apparatus of any of Aspects 11 to 16, wherein: the inertial height measurement includes an inertial height value in a first coordinate system; and the height constraint includes one or more coordinate values in a second coordinate system, wherein the one or more coordinate values in the second coordinate system are generated as a matrix multiplication product between the inertial height value and a portion of the transition matrix associated with a height dimension of the first coordinate system.

Aspect 18: The apparatus of any of Aspects 11 to 17, wherein the at least one processor is configured to: generate the height constraint by using at least a portion of the transition matrix to project the inertial height measurement along each dimension of a Cartesian coordinate system; and determine the one or more positioning measurements includes using the height constraint as a measurement update to a Kalman filter.

Aspect 19: The apparatus of any of Aspects 11 to 18, wherein the inertial height measurement is obtained based on a determination that one or more RTK positioning signals are unavailable.

Aspect 20: The apparatus of any of Aspects 11 to 19, wherein the inertial height measurement is obtained based on a determination that one or more RTK carrier-phase measurements were not received.

Aspect 21: A non-transitory computer-readable medium having stored thereon instructions that, when executed by one or more processors, cause the one or more processors to: obtain an inertial height measurement, wherein the inertial height measurement is obtained based on a determination that one or more positioning signals are unavailable; generate a height constraint using the inertial height measurement, wherein the height constraint is generated based at least in part on a transition matrix; and determine one or more positioning measurements based on using the height constraint as a real-time kinematic (RTK) positioning input.

Aspect 22: The non-transitory computer-readable medium of Aspect 21, wherein the instructions cause the one or more processors to: obtain the inertial height measurement from an inertial measurement unit (IMU), wherein the inertial height measurement is obtained based on one or more of a determination that a dead reckoning (DR) age associated with the IMU is above a first threshold or a determination that an uncertainty associated with the IMU is above a second threshold.

Aspect 23: The non-transitory computer-readable medium of Aspect 22, wherein the instructions further cause the one or more processors to: obtain a three-dimensional (3D) inertial position measurement, wherein the 3D inertial position measurement includes the inertial height measurement and is obtained based on a determination that the DR age associated with the IMU is below the first threshold or a determination that the uncertainty associated with the IMU is below the second threshold; generate a 3D position constraint using the 3D inertial position measurement, wherein the 3D position constraint is generated by applying the transition matrix to the 3D inertial position measurement; and determine one or more positioning measurements based on using the 3D position constraint as an RTK positioning input.

Aspect 24: The non-transitory computer-readable medium of Aspect 23, wherein: the 3D inertial position measurement is a geographic coordinate including the inertial height measurement, a first inertial horizontal displacement measurement, and a second inertial horizontal displacement measurement; the 3D position constraint is a Cartesian coordinate; and determining the one or more positioning measurements includes using the 3D position constraint as a measurement update to a Kalman filter.

Aspect 25: The non-transitory computer-readable medium of Aspect 24, wherein the instructions further cause the one or more processors to: use the transition matrix to project the inertial height measurement into a first set of Cartesian coordinates, to project the first inertial horizontal displacement measurement into a second set of Cartesian coordinates, and to project the second inertial horizontal displacement measurement into a third set of Cartesian coordinates; and combine the first set of Cartesian coordinates, the second set of Cartesian coordinates, and the third set of Cartesian coordinates to generate the 3D position constraint.

Aspect 26: The non-transitory computer-readable medium of any of Aspects 22 to 25, wherein: the inertial height measurement is a delta value determined between successive dead reckoning steps of the IMU; and the height constraint includes one or more Cartesian coordinate delta values generated by using at least a portion of the transition matrix to project the inertial height measurement delta value along each dimension of a Cartesian coordinate system.

Aspect 27: The non-transitory computer-readable medium of any of Aspects 21 to 26, wherein: the inertial height measurement includes an inertial height value in a first coordinate system; and the height constraint includes one or more coordinate values in a second coordinate system, wherein the one or more coordinate values in the second coordinate system are generated as a matrix multiplication product between the inertial height value and a portion of the transition matrix associated with a height dimension of the first coordinate system.

Aspect 28: The non-transitory computer-readable medium of any of Aspects 21 to 27, wherein the instructions further cause the one or more processors to: generate the height constraint by using at least a portion of the transition matrix to project the inertial height measurement along each dimension of a Cartesian coordinate system; and determine the one or more positioning measurements includes using the height constraint as a measurement update to a Kalman filter.

Aspect 29: The non-transitory computer-readable medium of any of Aspects 21 to 28, wherein the inertial height measurement is obtained based on a determination that one or more RTK positioning signals are unavailable.

Aspect 30: The non-transitory computer-readable medium of any of Aspects 21 to 29, wherein the inertial height measurement is obtained based on a determination that one or more RTK carrier-phase measurements were not received.

Aspect 31: A non-transitory computer-readable storage medium having stored thereon instructions which, when executed by one or more processors, cause the one or more processors to perform any of the operations of Aspects 1 to 30

Aspect 32: An apparatus comprising means for performing any of the operations of Aspects 1 to 30.

What is claimed is:

1. A method for positioning, comprising:
obtaining inertial measurement information from an inertial measurement unit (IMU), wherein the inertial measurement information corresponds to a first coordinate system associated with the IMU and includes at least an inertial height measurement associated with a height dimension of the first coordinate system, and wherein the inertial measurement information is obtained based on a determination that one or more positioning signals are unavailable for a real-time kinematic (RTK) positioning engine;
generating, based on a dead reckoning (DR) age associated with at least one of the IMU or the inertial measurement information, a dynamic position constraint for a set of dimensions of a second coordinate system associated with the RTK positioning engine, wherein the dynamic position constraint comprises a partial position constraint generated based on using a transition matrix to project only the inertial height measurement from the height dimension of the first coordinate system to along each respective dimension of the set of dimensions of the second coordinate system, and wherein the dynamic position constraint is generated as a partial position constraint in response to at least one of a determination that the DR age associated with the IMU is above a first threshold or a determination that an uncertainty associated with the IMU is above a second threshold; and
determining one or more positioning measurements based on using the dynamic position constraint as an RTK positioning input to the RTK positioning engine.

2. The method of claim 1, wherein:
obtaining the inertial measurement information comprises obtaining a three-dimensional (3D) inertial position measurement including a respective measurement value for each dimension of a set of dimensions of the first coordinate system, wherein the 3D inertial position measurement includes the inertial height measurement associated with the height dimension of the first coordinate system and a respective measurement value for one or more additional dimensions of the first coordinate system;
the dynamic position constraint comprises a 3D position constraint generated using the 3D inertial position measurement in response to a determination that the DR age is below a first threshold or a determination that an uncertainty associated with the IMU is below a second threshold, wherein the 3D position constraint is generated by applying the transition matrix to project the respective measurement value included in the 3D inertial position measurement for each dimension of the first coordinate system to a set of corresponding values along each respective dimension of the second coordinate system; and
determining the one or more positioning measurements is based on using the 3D position constraint as the RTK positioning input.

3. The method of claim 2, wherein:
the first coordinate system is a geographic coordinate system, and the 3D inertial position measurement is a geographic coordinate including the inertial height measurement, a first inertial horizontal displacement measurement, and a second inertial horizontal displacement measurement;

the second coordinate system is a Cartesian coordinate system, and the 3D position constraint is a Cartesian coordinate; and determining the one or more positioning measurements includes using the 3D position constraint as a measurement update to a Kalman filter.

4. The method of claim 3, further comprising:
using the transition matrix to project the inertial height measurement into a first set of Cartesian coordinates, to project the first inertial horizontal displacement measurement into a second set of Cartesian coordinates, and to project the second inertial horizontal displacement measurement into a third set of Cartesian coordinates; and combining the first set of Cartesian coordinates, the second set of Cartesian coordinates, and the third set of Cartesian coordinates to generate the 3D position constraint.

5. The method of claim 1, wherein:
the inertial height measurement is a delta value determined between successive dead reckoning steps of the IMU; and
the dynamic position constraint includes one or more Cartesian coordinate delta values generated by using at least a portion of the transition matrix to project the inertial height measurement delta value from the height dimension of the first coordinate system to along each respective dimension of a Cartesian coordinate system.

6. The method of claim 1, wherein:
the inertial height measurement includes an inertial height value in the first coordinate system; and
the dynamic position constraint includes one or more coordinate values in the second coordinate system, wherein the one or more coordinate values in the second coordinate system are generated as a matrix multiplication product between the inertial height value and a portion of the transition matrix associated with the height dimension of the first coordinate system.

7. The method of claim 1, further comprising:
generating the dynamic position constraint by using at least a portion of the transition matrix to project the inertial height measurement along each dimension of a Cartesian coordinate system; and
determining the one or more positioning measurements using the dynamic position constraint as a measurement update to a Kalman filter of the RTK positioning engine.

8. The method of claim 1, wherein the inertial measurement information is obtained based on a determination that one or more RTK positioning signals are unavailable.

9. The method of claim 1, wherein the inertial measurement information is obtained based on a determination that one or more RTK carrier-phase measurements were not received.

10. An apparatus for positioning, the apparatus comprising:
at least one transceiver;
at least one memory; and
at least one processor coupled to the at least one transceiver and the at least one memory and configured to:
obtain inertial measurement information from an inertial measurement unit (IMU), wherein the inertial measurement information corresponds to a first coordinate system associated with the IMU and includes at least an inertial height measurement associated with a height dimension of the first coordinate system, and wherein the inertial measurement information is obtained based on a determination that one or more positioning signals are unavailable for a real-time kinematic (RTK) positioning engine;

generate, based on a dead reckoning (DR) age associated with at least one of the IMU or the inertial measurement information, a dynamic position constraint for a set of dimensions of a second coordinate system associated with the RTK positioning engine, wherein the dynamic position constraint comprises a partial position constraint generated based on using a transition matrix to project only the inertial height measurement from the height dimension of the first coordinate system to along each respective dimension of the set of dimensions of the second coordinate system, and wherein the dynamic position constraint is generated as a partial position constraint in response to at least one of a determination that the DR age associated with the IMU is above a first threshold or a determination that an uncertainty associated with the IMU is above a second threshold; and determine one or more positioning measurements based on using the dynamic position constraint as an RTK positioning input to the RTK positioning engine.

11. The apparatus of claim 10, wherein:
to obtain the inertial height measurement, the at least one processor is configured to obtain a three-dimensional (3D) inertial position measurement including a respective measurement value for each dimension of a set of dimensions of the first coordinate system, wherein the 3D inertial position measurement includes the inertial height measurement associated with the height dimension of the first coordinate system and a respective measurement value for one or more additional dimensions of the first coordinate system;

the dynamic position constraint comprises a 3D position constraint generated using the 3D inertial position measurement in response to a determination that the DR age is below a first threshold or a determination that an uncertainty associated with the IMU is below a second threshold, wherein the 3D position constraint is generated by applying the transition matrix to project the respective measurement value included in the 3D inertial position measurement for each dimension of the first coordinate system to a set of corresponding values along each respective dimension of the second coordinate system; and the at least one processor is configured to determine the one or more positioning measurements based on using the 3D position constraint as the RTK positioning input.

12. The apparatus of claim 11, wherein:
the first coordinate system is a geographic coordinate system, and the 3D inertial position measurement is a geographic coordinate including the inertial height measurement, a first inertial horizontal displacement measurement, and a second inertial horizontal displacement measurement;

the second coordinate system is a Cartesian coordinate system, and the 3D position constraint is a Cartesian coordinate; and determining the one or more positioning measurements includes using the 3D position constraint as a measurement update to a Kalman filter.

13. The apparatus of claim 12, wherein the at least one processor is configured to:
  use the transition matrix to project the inertial height measurement into a first set of Cartesian coordinates, to project the first inertial horizontal displacement measurement into a second set of Cartesian coordinates, and to project the second inertial horizontal displacement measurement into a third set of Cartesian coordinates; and
  combine the first set of Cartesian coordinates, the second set of Cartesian coordinates, and the third set of Cartesian coordinates to generate the 3D position constraint.

14. The apparatus of claim 10, wherein:
  the inertial height measurement is a delta value determined between successive dead reckoning steps of the IMU; and
  the dynamic position constraint includes one or more Cartesian coordinate delta values generated by using at least a portion of the transition matrix to project the inertial height measurement delta value from the height dimension of the first coordinate system to along each respective dimension of a Cartesian coordinate system.

15. The apparatus of claim 11, wherein:
  the inertial height measurement includes an inertial height value in the first coordinate system; and
  the dynamic position constraint includes one or more coordinate values in the second coordinate system, wherein the one or more coordinate values in the second coordinate system are generated as a matrix multiplication product between the inertial height value and a portion of the transition matrix associated with the height dimension of the first coordinate system.

16. The apparatus of claim 10, wherein the at least one processor is configured to:
  generate the dynamic position constraint by using at least a portion of the transition matrix to project the inertial height measurement along each dimension of a Cartesian coordinate system; and
  determine the one or more positioning measurements using the dynamic position constraint as a measurement update to a Kalman filter of the RTK positioning engine.

17. The apparatus of claim 10, wherein the inertial measurement information is obtained based on a determination that one or more RTK positioning signals are unavailable.

18. The apparatus of claim 10, wherein the inertial measurement information is obtained based on a determination that one or more RTK carrier-phase measurements were not received.

19. A non-transitory computer-readable medium having stored thereon instructions that, when executed by one or more processors, cause the one or more processors to:
  obtain inertial measurement information from an inertial measurement unit (IMU), wherein the inertial measurement information corresponds to a first coordinate system associated with the IMU and includes at least an inertial height measurement associated with a height dimension of the first coordinate system, and wherein the inertial measurement information is obtained based on a determination that one or more positioning signals are unavailable for a real-time kinematic (RTK) positioning engine;
  generate, based on a dead reckoning (DR) age associated with at least one of the IMU or the inertial measurement information, a dynamic position constraint for a set of dimensions of a second coordinate system associated with the RTK positioning engine, wherein the dynamic position constraint comprises a partial position constraint generated based on using a transition matrix to project only the inertial height measurement from the height dimension of the first coordinate system to along each respective dimension of the set of dimensions of the second coordinate system, and wherein the dynamic position constraint is generated as a partial position constraint in response to at least one of a determination that the DR age associated with the IMU is above a first threshold or a determination that an uncertainty associated with the IMU is above a second threshold; and
  determine one or more positioning measurements based on using the dynamic position constraint as an RTK positioning input to the RTK positioning engine.

20. The non-transitory computer-readable medium of claim 19, wherein:
  to obtain the inertial height measurements, the instructions cause the one or more processors to obtain a three-dimensional (3D) inertial position measurement including a respective measurement value for each dimension of a set of dimensions of the first coordinate system, wherein the 3D inertial position measurement includes the inertial height measurement associated with the height dimension of the first coordinate system and a respective measurement value for one or more additional dimensions of the first coordinate system;
  the dynamic position constraint comprises a 3D position constraint generated using the 3D inertial position measurement in response to a determination that the DR age is below a first threshold or a determination that an uncertainty associated with the IMU is below a second threshold, wherein the 3D position constraint is generated by applying the transition matrix to project the respective measurement value included in the 3D inertial position measurement for each dimension of the first coordinate system to a set of corresponding values along each respective dimension of the second coordinate system; and
  the instructions cause the one or more processors to determine the one or more positioning measurements based on using the 3D position constraint as the RTK positioning input.

21. The non-transitory computer-readable medium of claim 20, wherein:
  the first coordinate system is a geographic coordinate system, and the 3D inertial position measurement is a geographic coordinate including the inertial height measurement, a first inertial horizontal displacement measurement, and a second inertial horizontal displacement measurement;
  the second coordinate system is a Cartesian coordinate system, and the 3D position constraint is a Cartesian coordinate; and
  to determine the one or more positioning measurements, the instructions cause the one or more processors to use the 3D position constraint as a measurement update to a Kalman filter.

22. The non-transitory computer-readable medium of claim 21, wherein the instructions further cause the one or more processors to:
  use the transition matrix to project the inertial height measurement into a first set of Cartesian coordinates, to project the first inertial horizontal displacement measurement into a second set of Cartesian coordinates, and to project the second inertial horizontal displacement measurement into a third set of Cartesian coordinates; and combine the first set of Cartesian coordinates, the second set of Cartesian coordinates, and the third set of Cartesian coordinates to generate the 3D position constraint.

23. The non-transitory computer-readable medium of claim 19, wherein:

the inertial height measurement is a delta value determined between successive dead reckoning steps of the IMU; and the dynamic position constraint includes one or more Cartesian coordinate delta values generated by using at least a portion of the transition matrix to project the inertial height measurement delta value from the height dimension of the first coordinate system to along each respective dimension of a Cartesian coordinate system.

24. The non-transitory computer-readable medium of claim 19, wherein:

the inertial height measurement includes an inertial height value in the first coordinate system; and the dynamic position constraint includes one or more coordinate values in the second coordinate system, wherein the one or more coordinate values in the second coordinate system are generated as a matrix multiplication product between the inertial height value and a portion of the transition matrix associated with the height dimension of the first coordinate system.

25. The non-transitory computer-readable medium of claim 19, wherein the instructions further cause the one or more processors to:

generate the dynamic position constraint by using at least a portion of the transition matrix to project the inertial height measurement along each dimension of a Cartesian coordinate system; and determine the one or more positioning measurements using the dynamic position constraint as a measurement update to a Kalman filter of the RTK positioning engine.

26. The non-transitory computer-readable medium of claim 19, wherein the inertial measurement information is obtained based on a determination that one or more RTK positioning signals are unavailable.

27. The non-transitory computer-readable medium of claim 19, wherein the inertial measurement information is obtained based on a determination that one or more RTK carrier-phase measurements were not received.

* * * * *